(12) United States Patent
Wu et al.

(10) Patent No.: US 10,708,617 B2
(45) Date of Patent: Jul. 7, 2020

(54) METHODS OF MODIFYING SEARCH AREAS

(71) Applicant: SZ DJI Technology Co., Ltd., Shenzhen (CN)

(72) Inventors: Yannan Wu, Shenzhen (CN); Xiaozheng Tang, Shenzhen (CN); Wei Chen, Shenzhen (CN); Zisheng Cao, Shenzhen (CN); Mingyu Wang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 115 days.

(21) Appl. No.: 15/452,680

(22) Filed: Mar. 7, 2017

(65) Prior Publication Data
US 2017/0180754 A1    Jun. 22, 2017

Related U.S. Application Data

(63) Continuation of application No. PCT/CN2015/085762, filed on Jul. 31, 2015.

(51) Int. Cl.
*H04N 19/57* (2014.01)
*H04N 19/61* (2014.01)
*H04N 19/56* (2014.01)
*H04N 19/527* (2014.01)
*H04N 19/513* (2014.01)

(52) U.S. Cl.
CPC ........... *H04N 19/57* (2014.11); *H04N 19/513* (2014.11); *H04N 19/527* (2014.11); *H04N 19/56* (2014.11); *H04N 19/61* (2014.11)

(58) Field of Classification Search
CPC .. H04N 19/172; H04N 19/124; H04N 19/137; H04N 19/115; H04N 19/51; H04N 19/503; B64C 39/024; B64C 2201/127
USPC .................................................... 375/240.16
See application file for complete search history.

(56) References Cited

U.S. PATENT DOCUMENTS

| | | | |
|---|---|---|---|
| 5,241,401 A | 8/1993 | Fujiwara et al. | |
| 6,192,075 B1 | 2/2001 | Jeng et al. | |
| 6,501,800 B1 | 12/2002 | Sawada | |
| 6,741,282 B1 | 5/2004 | Morris | |

(Continued)

FOREIGN PATENT DOCUMENTS

| | | |
|---|---|---|
| CN | 1668107 A | 9/2005 |
| CN | 1889687 A | 1/2007 |

(Continued)

OTHER PUBLICATIONS

Angelino, et al. Sensor aided H. 264 video encoder for uav applications. Picture Coding Symposium (PCS), 2013. IEEE, 2013.

(Continued)

*Primary Examiner* — Tung T Vo
(74) *Attorney, Agent, or Firm* — Anova Law Group, PLLC

(57) ABSTRACT

Methods and systems for evaluating a search area for encoding video are provided. The method comprises receiving video captured by an image capture device, the video comprising video frame components. Additionally, the method comprises receiving optical flow field data associated with the video frame component, wherein at least a portion of the optical flow field data is captured by sensors. The method also comprises determining a search area based on the optical flow field data.

17 Claims, 20 Drawing Sheets

(56) References Cited

U.S. PATENT DOCUMENTS

| | | | |
|---|---|---|---|
| 7,733,380 B1 | 6/2010 | Cote et al. | |
| 8,031,777 B2 | 10/2011 | Haskell et al. | |
| 8,854,458 B2* | 10/2014 | Fukamachi | G06T 7/215 |
| | | | 348/142 |
| 9,171,213 B2* | 10/2015 | Bulan | G06K 9/00785 |
| 10,356,419 B2 | 7/2019 | Miyashita et al. | |
| 2005/0024487 A1 | 2/2005 | Chen | |
| 2005/0232503 A1 | 10/2005 | Oishi | |
| 2006/0088191 A1* | 4/2006 | Zhang | G06K 9/00711 |
| | | | 382/107 |
| 2006/0098740 A1 | 5/2006 | Byun et al. | |
| 2006/0222078 A1 | 10/2006 | Raveendran | |
| 2007/0217517 A1* | 9/2007 | Heyward | H04N 5/145 |
| | | | 375/240.21 |
| 2008/0159385 A1 | 7/2008 | Joyce | |
| 2008/0187047 A1* | 8/2008 | Stephan | H04N 19/61 |
| | | | 375/240.16 |
| 2008/0198931 A1* | 8/2008 | Chappalli | H04N 19/51 |
| | | | 375/240.16 |
| 2008/0267296 A1 | 10/2008 | Shin et al. | |
| 2009/0092336 A1* | 4/2009 | Tsurumi | G06K 9/3216 |
| | | | 382/294 |
| 2010/0067741 A1* | 3/2010 | Stolkin | G06K 9/3241 |
| | | | 382/103 |
| 2010/0079605 A1 | 4/2010 | Wang et al. | |
| 2010/0246680 A1* | 9/2010 | Tian | H04N 19/00569 |
| | | | 375/240.16 |
| 2010/0305857 A1* | 12/2010 | Byrne | G06T 7/73 |
| | | | 701/301 |
| 2011/0043706 A1* | 2/2011 | Van Beek | G06T 7/0002 |
| | | | 348/699 |
| 2011/0249959 A1 | 10/2011 | Kim et al. | |
| 2011/0286635 A1* | 11/2011 | Nishigaki | G06T 7/248 |
| | | | 382/107 |
| 2011/0292996 A1 | 12/2011 | Jayant et al. | |
| 2011/0298942 A1 | 12/2011 | Uchida et al. | |
| 2012/0027258 A1* | 2/2012 | Uchida | G06K 9/00805 |
| | | | 382/103 |
| 2012/0075535 A1* | 3/2012 | Van Beek | H04N 5/145 |
| | | | 348/699 |
| 2012/0197461 A1* | 8/2012 | Barrows | G05D 1/0858 |
| | | | 701/1 |
| 2012/0207220 A1 | 8/2012 | Kim et al. | |
| 2012/0224629 A1* | 9/2012 | Bhagavathy | H04N 19/172 |
| | | | 375/240.08 |
| 2012/0294546 A1 | 11/2012 | Sakamoto et al. | |
| 2013/0286205 A1* | 10/2013 | Okada | H04N 7/18 |
| | | | 348/148 |
| 2013/0301706 A1 | 11/2013 | Qiu et al. | |
| 2013/0336387 A1 | 12/2013 | Ono et al. | |
| 2014/0023611 A1* | 1/2014 | Lewis | A61K 31/4453 |
| | | | 424/78.35 |
| 2014/0029664 A1 | 1/2014 | Au et al. | |
| 2014/0126832 A1* | 5/2014 | Lim | H04N 19/00539 |
| | | | 382/233 |
| 2014/0177706 A1* | 6/2014 | Fernandes | H04N 19/463 |
| | | | 375/240.03 |
| 2015/0030208 A1* | 1/2015 | Fragoulis | G06T 7/269 |
| | | | 382/107 |
| 2015/0104116 A1* | 4/2015 | Salvador | G06T 3/4053 |
| | | | 382/300 |
| 2015/0248586 A1* | 9/2015 | Gaidon | G06K 9/00711 |
| | | | 382/103 |
| 2015/0294178 A1* | 10/2015 | Jung | G06T 5/005 |
| | | | 382/195 |
| 2015/0365696 A1* | 12/2015 | Garud | H04N 19/53 |
| | | | 375/240.08 |
| 2016/0080760 A1* | 3/2016 | Nakaishi | H04N 19/533 |
| | | | 375/240.16 |
| 2016/0191946 A1 | 6/2016 | Zhou et al. | |
| 2016/0225161 A1* | 8/2016 | Hepper | H04N 5/145 |
| 2017/0180729 A1 | 6/2017 | Wu | |
| 2017/0208341 A1* | 7/2017 | Kulakov | H04N 19/533 |
| 2018/0288406 A1 | 10/2018 | Kouno | |

FOREIGN PATENT DOCUMENTS

| | | |
|---|---|---|
| CN | 101166276 A | 4/2008 |
| CN | 101325711 A | 12/2008 |
| CN | 103347185 A | 10/2013 |
| CN | 103533359 A | 1/2014 |
| CN | 104285433 A | 1/2015 |
| EP | 1921867 A1 | 5/2008 |
| JP | H06233270 A | 8/1994 |
| JP | 2004221757 A | 8/2004 |
| JP | 2005287031 A | 10/2005 |
| JP | 2005323021 A | 11/2005 |
| JP | 2007150458 A | 6/2007 |
| JP | 2008104181 A | 5/2008 |
| JP | 2009212937 A | 9/2009 |
| JP | 2013081101 A | 5/2013 |
| JP | 2014132706 A | 7/2014 |
| JP | 2014192700 A | 10/2014 |
| WO | WO-2013169785 A1 | 11/2013 |
| WO | 2015079470 A2 | 6/2015 |

OTHER PUBLICATIONS

Apostolopoulos. Error-Resilient Video Compression Through the use of Multiple States. Cited as about to appear in ICIP-2000, Vancouver, Canada.

Barron, et al. Systems and Experiment Performance of Optical Flow Techniques. International Journal of Computer Vision, 12 :1, 43-77 (1994).

Belfiore, et al. Concealment of Whole-Frame Losses for Wireless Low Bit-Rate Video Based on Multiframe Optical Flow Estimation. Transactions on Multimedia, vol. 7, No. 2, Apr. 2005; 316-329.

Co-pending U.S. Appl. No. 15/451,999, filed Mar. 7, 2017.

Hoang, et al. Efficient Cost Measures for Motion Estimation at Low Bit Rates. IEEE Transactions on Circuits and Systems for Video Technology, vol. 8, No. 4, Aug. 1998.

International search report and written opinion dated May 10, 2016 for PCT/CN2015/085762.

International search report dated Apr. 22, 2016 for PCT Application No. PCT/CN2015/085759.

Ma, et al. Rate-Distortion Analysis for H.264/AVC Video Coding and its Application to Rate Control. IEEE Transactions on Circuits and Systems for Video Technology, vol. 15, No. 12, Dec. 2005; 1533-1544.

Phantom 3 Professional User Manual V1.0, DJI, May 2015, pp. 1-55 http://download.dji-innovations.com/downloads/phantom_3/jp/Phantom_3_Professional_User_Manual_v1.0_jp.pdf (English Version Included).

* cited by examiner

METHODS OF MODIFYING SEARCH AREAS

CROSS REFERENCE

This application is a continuation application of International Patent Application No. PCT/CN2015/085762, filed Jul. 31, 2015, which is entirely incorporated herein by reference.

BACKGROUND

Aerial vehicles, such as unmanned aerial vehicles (UAVs), have been developed for a wide range of applications including surveillance, search and rescue operations, exploration, and other fields. Such UAVs may often carry a camera module on-board for video capturing.

The video captured by UAVs may be encoded by various methods. However, video encoding methods and systems for UAVs may be less than ideal. For example, packet loss may occur when captured video from a UAV is encoded and transmitted, especially when the video contains a large amount of movement.

SUMMARY

A need exists for improved methods and systems for encoding video obtained from video capture devices. The video capture devices may be carried by unmanned vehicles, such as unmanned aerial vehicles (UAVs). Methods are provided for encoding video captured by video capture devices, such as video capture devices on UAVs, by utilizing information from sensors associated with the UAVs. In some embodiments, the video capture devices may capture video that includes motion data. Additionally, a UAV may use sensors that are associated with the UAV to capture information that may be used to generate an optical flow field. When the captured video is aligned with a correlating optical flow field that is based on sensor information captured at a similar time as the video, the resulting information may be used to efficiently encode the video data. In particular, the aligned video and optical flow field data may be used to efficiently determine the location of motion vectors within the video. The motion vectors, in turn, may be used to reduce residual data that results from differences between a predicted video frame and a perceived video frame during processes of video encoding. Accordingly, methods directed towards accurately and efficiently identifying motion vectors may increase the efficiency and usefulness of video encoding processes.

An optical flow field that is generated using sensor data from a UAV may be used to efficiently encode video data that is aligned with the generated optical flow field. The video data may be encoded by a processor at the UAV, video capture device, or carrier on-board the UAV. The video data may be encoded by a processor external to the UAV, such as a user terminal that is communicatively connected to the UAV. Additionally, the optical flow field may be generated at the UAV. Alternatively, the optical flow field may be generated at an external location that is communicatively connected to the UAV. The sensor information that is used to generate the optical flow field may be detected at the UAV. Additionally or alternatively, the sensor information that is used to generate the optical flow field may be provided to the UAV from an external source that is communicatively connected to the UAV. Accordingly, video data that is captured by a video capture device may be efficiently encoded using an optical flow field that is generated based on sensor data that is associated with the UAV.

In particular, an optical flow field that corresponds to video data captured by a UAV may be used to efficiently identify a location of a motion vector associated with a video frame component within the video data. When encoding video data, it is beneficial to break up video data into video frame components and encode recognized similarities between video frame components, rather than encoding each frame over and over again. However, as some video data may have a great deal of movement, it is sometimes difficult to associate blocks of a first video frame with blocks of a second video frame, even when there may be a great amount of similarity between the two video frames. This is because, with great movement, the bias of the similar elements within a video frame may be shifted across a video frame. For example, as a camera shifts right, objects of the video that were formerly at the right edge of a video frame will be shifted to the left. However, conventional methods of encoding video data are based on the assumption that blocks at a particular location on a first video frame are associated with blocks at the same particular location on a second video frame. While conventional methods do make use of a search area so as to identify areas of interest surrounding an initial, co-located point of the block on the second video frame, the size and location of the search area that is used is not changed in view of movement of the camera. As such, the use of conventional methods to find connections, such as identifying shared motion vectors, between similar blocks among different video frames are generally lacking when there is a significant amount of movement associated with the video data.

Based on this shortcoming of conventional methods of encoding video data, aspects of the invention provide the use of optical flow field data to contextualize video data. In particular, an optical flow field that is aligned with the video data may be used to modify the size and shape of search areas used to identify connecting information between blocks across video frames, such as motion vectors. Additionally, the optical flow field may also be used to bias/shift an initial starting point of a search area for a motion vector associated with a block of a video frame so as to more accurately identify the motion vector within the block.

An aspect of the invention may include a method of evaluating a search area for encoding video. The method may comprise receiving video captured by an image capture device, the video comprising video frame components. Additionally, the method may comprise receiving optical flow field data associated with the video frame component, wherein at least a portion of the optical flow field data is captured by sensors. The method may also comprise determining a search area based on the optical flow field data.

Additionally, aspects of the invention may include a non-transitory computer readable medium containing program instructions for evaluating a search area for encoding video. The computer readable medium may include program instructions for receiving video captured by an image capture device, the video comprising video frame components. The computer readable medium may also include program instructions for receiving optical flow field data associated with the video frame component, wherein at least a portion of the optical flow field data is captured by sensors. Further, the computer readable medium may include program instructions for determining a search area based on the optical flow field data.

Aspects of the invention may also include a system for evaluating a search area for encoding video. The system may include an image capture device configured to capture a video. Additionally, the system may include one or more sensors configured to capture optical flow field data. The system may also include one or more processors. The one or more processors may be individually or collectively configured to receive the video captured by the image capture device. The video may comprise video frame components. Additionally, the one or more processors may be configured to receive optical flow field data associated with the video frame component, wherein at least a portion of the optical flow field data is captured by the one or more sensors. The one or more processors may also be configured to determine a search area based on the optical flow field data.

Aspects of the invention may further include a method of identifying a motion vector of a video frame component. The method may comprise receiving video captured by an image capture device, the video comprising the video frame component. Additionally, the method may comprise receiving optical flow field data associated with the video frame component. The method may also comprise determining a search area for assessing a motion vector, wherein the search area is based on the received optical flow field data.

Additionally, aspects of the invention may include a non-transitory computer readable medium containing program instructions for determining a motion vector of a video frame component. The computer readable medium may include program instructions for receiving video captured by an image capture device, the video comprising the video frame component. The computer readable medium may also include program instructions for receiving optical flow field data associated with the video frame component. Additionally, the computer readable medium may include program instructions for determining a search area for assessing the motion vector, wherein the search area is based on the received optical flow field data.

Aspects of the invention may also include a system for identifying a motion vector of a video frame component. The system may include an image capture device configured to capture a video. The system may also include one or more sensors configured to capture optical flow field data. Additionally, the system may include one or more processors. The one or more processors may be configured to receive video captured by the image capture device, the video comprising the video frame component. The one or more processors may also be configured to receive the optical flow field data associated with the video frame component. Additionally, the one or more processors may be configured to determine a search area for assessing the motion vector, the search area comprising the initial point, wherein the dimensions of the search area is based on the received optical flow field data.

In further aspects of the invention may include a method of determining a search area for encoding video. The method may comprise receiving video captured by an image capture device, the video comprising a video frame. The method may also comprise receiving motion data associated with the video frame, wherein the motion data are captured by sensors. Additionally, the method may comprise determining a search area within the video frame based on the motion data, wherein the search area is used to evaluate motion of the video captured by the image capture device.

Additional aspects of the invention may include a non-transitory computer readable medium containing program instructions for determining a search area for encoding video. The computer readable medium may include program instructions for receiving video captured by an image capture device, the video comprising a video frame. Additionally, the computer readable medium may include program instructions for receiving motion data associated with the video frame, wherein the motion data are captured by sensors, and wherein the video frame comprises a plurality of blocks. Further, the computer readable medium may include program instructions for determining a search area within the video frame based on the motion data.

Aspects of the invention may also include a system for determining a search area for encoding video. The system may include an image capture device configured to capture a video. Additionally, the system may include one or more sensors configured to capture motion data. The system may also include one or more processors. The one or more processors may be configured to receive the video captured by the image capture device, the video comprising a video frame. The one or more processors may also be configured to receive motion data associated with the video frame, wherein the motion data are captured by sensors, and wherein the video frame comprises a plurality of blocks. Additionally, the one or more processors may be configured to determine a search area within the video frame based on the motion data.

Additional aspects of the invention may include a method of determining a search area for encoding video. The method may include receiving video captured by an image capture device, the video comprising a first video frame and a second video frame, each of which comprises a plurality of blocks. The method may also include receiving motion data associated with the second video frame, wherein the motion data are captured by sensors. Additionally, the method may include determining a search area within the first video frame based on the motion data associated with the second video frame.

Additional aspects of the invention may include a non-transitory computer readable medium containing program instructions for determining a search area for encoding video. The computer readable medium may include program instructions for receiving video captured by an image capture device, the video comprising a first video frame and a second video frame, each of which comprises a plurality of blocks. Additionally, the computer readable medium may include program instructions for receiving motion data associated with the second video frame, wherein the motion data are captured by sensors. Further, the computer readable medium may include program instructions for determining a search area within the first video frame based on the motion data associated with the second video frame.

Aspects of the invention may also include a system for determining a search area for encoding video. The system may include an image capture device configured to capture a video. Additionally, the system may include one or more sensors configured to capture motion data. The system may also include one or more processors. The one or more processors may be configured to receive the video captured by the image capture device, the video comprising a first video frame and a second video frame, each of which comprises a plurality of blocks. The one or more processors may also be configured to receive motion data associated with the second video frame, wherein the motion data are captured by sensors. Additionally, the one or more processors may be configured to determine a search area within the first video frame based on the motion data associated with the second video frame.

Another aspect of the invention may include a method of encoding video captured by an aerial vehicle. The method may comprise receiving video captured by an image capture device on-board the aerial vehicle, the video comprising video frame components. Additionally, the method may comprise receiving optical flow field data associated with a video frame component, wherein at least a portion of the optical flow field data is captured by sensors on-board the aerial vehicle. The method may also comprise evaluating motion of the video captured by the image capture device for video encoding, based on the optical flow field data.

Additionally, aspects of the invention may include a non-transitory computer readable medium containing program instructions for encoding video captured by an aerial vehicle. The computer readable medium may include program instructions for receiving video captured by an image capture device on-board the aerial vehicle, the video comprising video frame components. The computer readable medium may also include program instructions for receiving optical flow field data associated with a video frame component, wherein at least a portion of the optical flow field data is captured by sensors on-board the aerial vehicle. Further, the computer readable medium may include program instructions for evaluating motion of the video captured by the image capture device for video encoding, based on the optical flow field data.

Aspects of the invention may also include a system for encoding video captured by an aerial vehicle. The system may include an image capture device on-board an aerial vehicle, said image capture device configured to capture a video. Additionally, the system may include one or more sensors on-board the aerial vehicle, said one or more sensors configured to capture optical flow field data. The system may also include one or more processors. The one or more processors may be individually or collectively configured to receive the video captured by an image capture device, the video comprising video frame components. Additionally, the one or more processors may be configured to receive the optical flow field data associated with a video frame component, wherein at least a portion of the optical flow field data is captured by the sensors. The one or more processors may also be configured to evaluate motion of the video captured by the image capture device for video encoding, based on the optical flow field data.

It shall be understood that different aspects of the invention may be appreciated individually, collectively, or in combination with each other. Various aspects of the invention described herein may be applied to any of the particular applications set forth below or for any other types of movable objects. Any description herein of aerial vehicles, such as unmanned aerial vehicles, may apply to and be used for any movable object, such as any vehicle. Additionally, the systems, devices, and methods disclosed herein in the context of encoding video while a video capture device is capturing video data of aerial motion (e.g., flight) may also be applied in the context of encoding video while a video capture device is capturing video data of other types of motion, such as movement on the ground or on water, underwater motion, or motion in space.

Other objects and features of the present invention will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

The methods, devices and terminals described herein provide effective approaches for efficiently encoding video captured by a video capture device, such as video capture devices on-board unmanned aerial vehicles (UAVs). The methods, devices and terminals described herein may be used to capture video data, generate an optical flow field based on sensor data associated with the UAV, and modify search areas for use in encoding the video data based on the generated optical flow field. The methods, devices and terminals disclosed herein may be applied to video that is captured by a video capture device that is attached to any suitable movable object or stationery objects. A movable object may be capable of self-propelled movement (e.g., a vehicle), while a stationary object may not be capable of self-propelled movement. In some embodiments, the movable object may be an unmanned aerial vehicle (UAV).

Accordingly, methods that are provided may be used to efficiently encode video data. When video data is more efficiently encoded, a larger amount of video data may be recorded given a set amount of storage space. Alternatively, video that has increased capacity may be recorded within the same amount of storage space that previously would only be able to record the same amount of general video data. This is beneficial in recording high-definition video, or in recording video having a high degree of movement.

The way methods of the invention are able to efficiently encode video data is by efficiently searching for motion vectors that link aspects of video frames across time. In particular, the methods for searching for these linking aspects are contextualized based on other influences that are affecting objects that are being captured in the video data, such as influences associated with movement of the video capture device. In this way, by contextualizing motion vectors with the movement of the video capture device and other influences that are captured by sensors of a UAV that is used to mount the video capture device, the search area needed to identify these linking motion vectors is minimized. As such, the effort needed to encode the video data is minimized.

Figure 1:
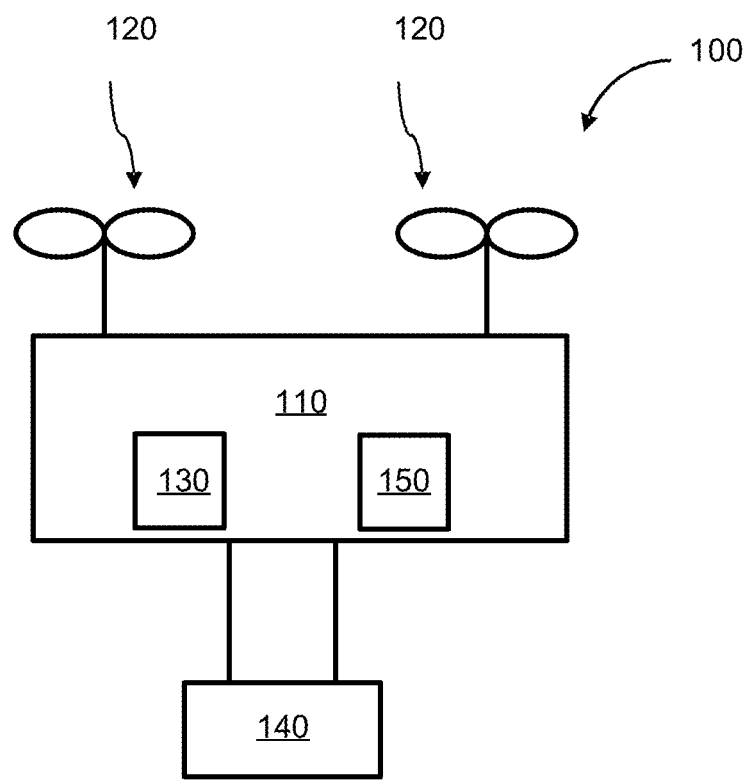
FIG. 1 shows a schematic view of an unmanned aerial vehicle (UAV) carrying a video capture device that is used to capture video, in accordance with embodiments of the invention.

FIG. 1 shows a schematic view of an unmanned aerial vehicle (UAV) 100 carrying a video capture device 140 that is used to capture video in accordance with embodiments of the invention. The UAV may have a UAV body 110 and one or more propulsion units 120 that may effect movement of the UAV. The UAV may have one or more sensors. The one or more sensors may be used to gather data that is used by the UAV to generate an optical flow field. The UAV may optionally have an on-board optical flow field generator 130. The optical flow field that is generated by the UAV may, in turn, be used to efficiently encode video that is captured by the UAV. An encoding processor 150 may optionally be carried by the UAV and used to encode the video.

Video may be captured using a video capture device 140. The video capture device may be supported on a stationary object or a movable object, such as a UAV. Any description herein of a UAV may include any support structure for the video capture device. Any description herein of a UAV 100 may apply to any type of movable object, such as an aerial vehicle. The description of a UAV may apply to any type of unmanned movable object (e.g., which may traverse the air, land, water, or space). The UAV may be capable of responding to commands from a remote controller. The remote controller may be not connected to the UAV; rather, the remote controller may communicate with the UAV wirelessly from a distance. In some instances, the UAV may be capable of operating autonomously or semi-autonomously. The UAV may be capable of following a set of pre-programmed instructions. In some instances, the UAV may operate semi-autonomously by responding to one or more commands from a remote controller while otherwise operating autonomously. For instance, one or more commands from a remote controller may initiate a sequence of autonomous or semi-autonomous actions by the UAV in accordance with one or more parameters. In some embodiments, any description herein of a UAV may apply to any stationary object, such as a support for the video capture device (e.g., stand, pole, fence, building, wall, ceiling, roof, floor, ground, furniture, lighting fixture, tree, plant, stone, or any other stationary object).

The video capture device may be capable of altering a field of view (FOV) captured by the video capture device. The video capture device may have translational motion (e.g., side to side, front to back, up and down, or any combination thereof) to alter the video capture device FOV. The video capture device may have rotational movement (e.g., about a yaw, pitch, or roll axis of the video capture device) to alter the video capture device FOV. In some instances, the video capture device may only have translational motion without rotational motion, may only have rotational motion without translational motion, or may have both translational and rotational motion. Motion captured by video from the video capture device may be indicative of change of the video capture device FOV. The video encoding systems and methods may be used to encode the video captured by the video capture device, as described in greater detail elsewhere herein.

The video capture device may optionally be supported by a UAV 100 or any other support structure. The UAV may have a body 110. In some instances, the body may be a central body which may have one or more branching members, or "arms." The arms may extend outward from the body in a radial manner and be joined via the body. The number of arms may match the number of propulsion units, or rotors, of the UAV. The body may comprise a housing. The housing may enclose one or more components of the UAV within the housing. In some instances, one or more electrical components of the UAV may be provided within the housing. For example, a flight controller of the UAV may be provided within the housing. The flight controller may control operation of one or more propulsion units 120 of the UAV. The propulsion units may each include the rotors and/or motors. Additionally, the one or more propulsion units may permit the UAV to move about in the air. The one or more propulsion units may be provided on an arm of the UAV. The arm may be connected to a body of the UAV on a proximal end of the arm. One or more propulsion units may be connected to a distal end of the arm. The one or more propulsion units may enable the UAV to move about one or more, two or more, three or more, four or more, five or more, six or more degrees of freedom. In some instances, the UAV may be able to rotate about one, two, three or more axes of rotation. The axes of rotation may be orthogonal to one another. The axes of rotation may remain orthogonal to one another throughout the course of the UAV's flight. The axes of rotation may include a pitch axis, roll axis, and/or yaw axis. The UAV may be able to move along one or more dimensions. For example, the UAV may be able to move upwards due to the lift generated by one or more rotors. In some instances, the UAV may be capable of moving along a Z axis (which may be up relative to the UAV orientation), an X axis, and/or a Y axis (which may be lateral). The UAV may be capable of moving along one, two, or three axes that may be orthogonal to one another.

The UAV may be a rotorcraft. In some instances, the UAV may be a multi-rotor craft that may include a plurality of rotors. The plurality of rotors may be capable of rotating to generate lift for the UAV. The rotors may be propulsion units that may enable the UAV to move about freely through the air. The rotors may rotate at the same rate and/or may generate the same amount of lift or thrust. The rotors may optionally rotate at varying rates, which may generate different amounts of lift or thrust and/or permit the UAV to rotate. In some instances, one, two, three, four, five, six, seven, eight, nine, ten, or more rotors may be provided on a UAV. The rotors may be arranged so that their axes of rotation are parallel to one another. In some instances, the rotors may have axes of rotation that are at any angle relative to one another, which may affect the motion of the UAV.

The UAV shown may have a plurality of rotors. The rotors may connect to the body of the UAV which may comprise a control unit, one or more sensors, a processor, and a power source. The sensors may include vision sensors and/or other sensors that may collect information about the UAV environment. The information from the sensors may be used to determine a location of the UAV. The rotors may be connected to the body via one or more arms or extensions that may branch from a central portion of the body. For example, one or more arms may extend radially from a central body of the UAV, and may have rotors at or near the ends of the arms.

A vertical position and/or velocity of the UAV may be controlled by maintaining and/or adjusting output to one or more propulsion units of the UAV. For example, increasing the speed of rotation of one or more rotors of the UAV may aid in causing the UAV to increase in altitude or increase in altitude at a faster rate. Increasing the speed of rotation of the one or more rotors may increase the thrust of the rotors. Decreasing the speed of rotation of one or more rotors of the UAV may aid in causing the UAV to decrease in altitude or decrease in altitude at a faster rate. Decreasing the speed of rotation of the one or more rotors may decrease the thrust of the one or more rotors. When a UAV is taking off, the output provided to the propulsion units may be increased from its previous landed state. When the UAV is landing, the output provided to the propulsion units may be decreased from its previous flight state. The UAV may be configured to take off and/or land in a substantially vertical manner.

A lateral position and/or velocity of the UAV may be controlled by maintaining and/or adjusting output to one or more propulsion units of the UAV. The altitude of the UAV and the speed of rotation of one or more rotors of the UAV may affect the lateral movement of the UAV. For example, the UAV may be tilted in a particular direction to move in that direction and the speed of the rotors of the UAV may affect the speed of the lateral movement and/or trajectory of movement. Lateral position and/or velocity of the UAV may be controlled by varying or maintaining the speed of rotation of one or more rotors of the UAV.

The arms of the UAV may be tubes or rods. The arms of the UAV may have a circular cross section. The arms of the UAV may have a square or rectangular cross section. The arms of the UAV may have an elliptic cross section. The arms of the UAV may be hollow tubes. The arms of the UAV may be solid tubes. The arms of the UAV may be formed from a metallic, plastic, or composite material. The arms of the UAV may be formed from a lightweight material. The arms of the UAV may be formed from carbon fiber. The arms of the UAV may be integrally formed with the central body of the UAV. Alternatively, the arms of the UAV may be separately formed or may be separable from the UAV.

The UAV may have a greatest dimension (e.g., length, width, height, diagonal, diameter) of no more than 100 cm. In some instances, the greatest dimension may be less than or equal to 1 mm, 5 mm, 1 cm, 3 cm, 5 cm, 10 cm, 12 cm, 15 cm, 20 cm, 25 cm, 30 cm, 35 cm, 40 cm, 45 cm, 50 cm, 55 cm, 60 cm, 65 cm, 70 cm, 75 cm, 80 cm, 85 cm, 90 cm, 95 cm, 100 cm, 110 cm, 120 cm, 130 cm, 140 cm, 150 cm, 160 cm, 170 cm, 180 cm, 190 cm, 200 cm, 220 cm, 250 cm, or 300 cm. Optionally, the greatest dimension of the UAV may be greater than or equal to any of the values described herein. The UAV may have a greatest dimension falling within a range between any two of the values described herein. The UAV may be lightweight UAV. For example, the UAV may weigh less than or equal to 1 mg, 5 mg, 10 mg, 50 mg, 100 mg, 500 mg, 1 g, 2 g, 3 g, 5 g, 7 g, 10 g, 12 g, 15 g, 20 g, 25 g, 30 g, 35 g, 40 g, 45 g, 50 g, 60 g, 70 g, 80 g, 90 g, 100 g, 120 g, 150 g, 200 g, 250 g, 300 g, 350 g, 400 g, 450 g, 500 g, 600 g, 700 g, 800 g, 900 g, 1 kg, 1.1 kg, 1.2 kg, 1.3 kg, 1.4 kg, 1.5 kg, 1.7 kg, 2 kg, 2.2 kg, 2.5 kg, 3 kg, 3.5 kg, 4 kg, 4.5 kg, 5 kg, 5.5 kg, 6 kg, 6.5 kg, 7 kg, 7.5 kg, 8 kg, 8.5 kg, 9 kg, 9.5 kg, 10 kg, 11 kg, 12 kg, 13 kg, 14 kg, 15 kg, 17 kg, or 20 kg. The UAV may have a weight greater than or equal to any of the values described herein. The UAV may have a weight falling within a range between any two of the values described herein.

The UAV may carry the video capture device 140. The video capture device may be supported by any support structure, moving (e.g., UAV) or stationary. In some embodiments, the video capture device may be a camera. Any description herein of a camera may apply to any type of video capture device. The camera may be rigidly coupled to the support structure. Alternatively, the camera may be permitted to move relative to the support structure with respect to up to six degrees of freedom. The camera may be directly mounted onto the support structure, or coupled to a carrier mounted onto the support structure. In some embodiments, the carrier may be a gimbal. In some embodiments, the camera may be an element of a payload of the support structure, such as a UAV.

The camera may capture images (e.g., dynamic images such as video, or still images such as snapshots) of an environment of the UAV. The camera may continuously capture images (e.g., video). Alternatively, the camera may capture images (e.g., video) at a specified frequency to produce a series of image data (e.g., video data) over time. Any description herein of video may apply to any type of images, such as dynamic or still images, such as a series of images captured over time. Images may be captured at a video rate (e.g., 25, 50, 75, 100, 125, 150, 175, 200, 225, or 250 Hz). In some embodiments, the video may be captured simultaneously with a recording of environment audio.

In some embodiments, the captured video may be stored in a memory on-board the UAV. The memory may be a non-transitory computer readable medium that may include one or more memory units (e.g., removable media or external storage such as a Secure Digital (SD) card, or a random access memory (RAM), or a read only memory (ROM) or a flash memory). Alternatively, the captured video and/or images may be transmitted to a remote terminal. The transmission of captured video and/or images may be implemented over a wireless link, including but not limited to, a radio frequency (RF) link, a Wi-Fi link, a blue tooth link, a 2G link, a 3G link, or a LTE link. The memory may be on the camera carried by the UAV, on a carrier of the UAV, and/or on the UAV itself (e.g., within the UAV body or an arm of the UAV). The memory may or may not be removable or separable from the UAV, carrier, or camera.

The camera may comprise an image sensor and one or more lenses. The one or more lenses may be configured to direct light to the image sensor. An image sensor is a device that converts an optical image into an electronic signal. The image sensor of the camera may be a charge-coupled device (CCD) type, a complementary metal-oxide-semiconductor (CMOS) type, an N-type metal-oxide-semiconductor (NMOS) type, or a back-side illuminated CMOS (BSI-CMOS) type.

The camera may have a focal length or focal length range. A focal length of an optical system may be a measure of how strongly the system converges or diverges light. The focal length that is associated with the camera may influence a resulting optical flow field that is generated using video that is captured by the camera. The focal length of a lens may be the distance over which initially collimated rays are brought to a focus. The camera may have any type of lens, such as a prime lens or a zoom lens. A prime lens may have a fixed focal length and the focal length may encompass a single focal length. A zoom lens may have variable focal lengths and the focal length may encompass a plurality of focal lengths.

The video capture device may have a FOV that may change over time. The field of view (FOV) may be a part of the world that is visible through the camera at a particular position and orientation in space; objects outside the FOV when the picture is taken are not recorded in the video data. It is most often expressed as the angular size of the view cone, as an angle of view. For normal lens, field of view may be calculated as FOV=2 arctan(d/2f), where d is image sensor size, and f is focal length of the lens. For an image sensor having a fixed size, the prime lens may have a fixed FOV and the FOV may encompass a single FOV angle. For an image sensor having a fixed size, the zoom lens may have variable FOV angular range and the FOV angular range may encompass a plurality of FOV angles. The size and/or location of the FOV may change. The FOV of the video capture device may be altered to increase or decrease the size of the FOV (e.g., zooming in or out), and/or to change a centerpoint of the FOV (e.g., moving the video capture device translationally and/or rotationally). Alteration of the FOV may result in motion within the video.

Data from sensors associated with a camera may be used to aid in generating an optical flow field, useful for encoding video data captured by the camera. The sensors associated with the camera may be on-board the camera, the support structure for the camera (e.g., UAV), and/or a carrier that supports the camera on the support structure (e.g., gimbal). Alternatively, the sensors associated with the camera may be remote from the camera, the carrier, and/or the support structure for the camera.

For instance, a support structure of the camera may support one or more sensors. In examples, the support structure may be a UAV. Any description of the sensors of the UAV may apply to any type of support structure for the camera. The UAV may comprise one or more vision sensors such as an image sensor. For example, an image sensor may be a monocular camera, stereo vision camera, radar, sonar, or an infrared camera. The UAV may further comprise other sensors that may be used to determine a location of the UAV, or may be useful for generating optical flow field information, such as global positioning system (GPS) sensors, inertial sensors which may be used as part of or separately from an inertial measurement unit (IMU) (e.g., accelerometers, gyroscopes, magnetometers), lidar, ultrasonic sensors, acoustic sensors, WiFi sensors. The UAV may have sensor on-board the UAV that collect information directly from an environment without contacting an additional component off-board the UAV for additional information or processing. For example, a sensor that collects data directly in an environment may be a vision or audio sensor.

Alternatively, the UAV may have sensors that are on-board the UAV but contact one or more components off-board the UAV to collect data about an environment. For example, a sensor that contacts a component off-board the UAV to collect data about an environment may be a GPS sensor or another sensor that relies on connection to another device, such as a satellite, tower, router, server, or other external device. Various examples of sensors may include, but are not limited to, location sensors (e.g., global positioning system (GPS) sensors, mobile device transmitters enabling location triangulation), vision sensors (e.g., imaging devices capable of detecting visible, infrared, or ultraviolet light, such as cameras), proximity or range sensors (e.g., ultrasonic sensors, lidar, time-of-flight or depth cameras), inertial sensors (e.g., accelerometers, gyroscopes, inertial measurement units (IMUs)), altitude sensors, attitude sensors (e.g., compasses) pressure sensors (e.g., barometers), audio sensors (e.g., microphones) or field sensors (e.g., magnetometers, electromagnetic sensors). Any suitable number and combination of sensors may be used, such as one, two, three, four, five, or more sensors. Optionally, the data may be received from sensors of different types (e.g., two, three, four, five, or more types). Sensors of different types may measure different types of signals or information (e.g., position, orientation, velocity, acceleration, proximity, pressure, etc.) and/or utilize different types of measurement techniques to obtain data.

Any of these sensors may also be provided off-board the UAV. The sensors may be associated with the UAV. For instance, the sensors may detect characteristics of the UAV such as position of the UAV, speed of the UAV, acceleration of the UAV, orientation of the UAV, noise generated by the UAV, light emitted or reflected from the UAV, heat generated by the UAV, or any other characteristic of the UAV. The sensors may collect data that may be used alone or in combination with sensor data from sensors on-board the UAV to generate optical flow field information.

The sensors may include any suitable combination of active sensors (e.g., sensors that generate and measure energy from their own energy source) and passive sensors (e.g., sensors that detect available energy). As another example, some sensors may generate absolute measurement data that is provided in terms of a global coordinate system (e.g., position data provided by a GPS sensor, attitude data provided by a compass or magnetometer), while other sensors may generate relative measurement data that is provided in terms of a local coordinate system (e.g., relative angular velocity provided by a gyroscope; relative translational acceleration provided by an accelerometer; relative attitude information provided by a vision sensor; relative distance information provided by an ultrasonic sensor, lidar, or time-of-flight camera). The sensors on-board or off-board the UAV may collect information such as location of the UAV, location of other objects, orientation of the UAV 100, or environmental information. A single sensor may be able to collect a complete set of information in an environment or a group of sensors may work together to collect a complete set of information in an environment. Sensors may be used for mapping of a location, navigation between locations, detection of obstacles, or detection of a target. Additionally, and in accordance with the invention, the sensors may be used to gather data which is used to generate an optical flow field that is used to efficiently encode video data captured by the UAV.

Accordingly, the UAV may also have an optical flow field generator 130. The optical flow field generator may be provided on-board the UAV (e.g., in the UAV body or arm, on the camera, or on the carrier). Alternatively, the optical flow field generated may be provided off-board the UAV (e.g., at a remote server, cloud computing infrastructure, remote terminal, or ground station). The optical flow field generator may have one or more processors that are individually or collectively configured to generate an optical flow field based on sensor data that is associated with the UAV. An optical flow field demonstrates how light flows within video frames. This flow of light indicates how captured objects are moving between video frames. In particular, the optical flow field is able to describe characteristics of how objects that are captured by a video capturing device are moving. For instance, the video captured within the FOV of the video capturing device may include one or more stationary or movable objects. In examples, the optical flow field may be used to determine speeds or accelerations of objects that are moving in video. The optical flow field may also be used to demonstrate directions of movement of objects that are within the video. Examples of optical flow fields that describe objects moving within a video are described below with respect to FIGS. 7 to 11.

The sensor data that is used to generate the optical flow field may be obtained by the one or more sensors associated with the UAV. Additionally or alternatively, the sensor data may be obtained by an external source, such as an external monitoring system. The external sensor data may be provided to the UAV using a communication channel. Accordingly, the optical flow field may be generated at the UAV. Alternatively, an optical flow field may be generated external to the UAV. In particular, the UAV may provide sensor information that is associated with the UAV to one or more external processors. The one or more external processors may then use the sensor data that is associated with the UAV to generate an optical flow field. Further, the one or more external processors may provide the optical flow field that is generated to the UAV. The optical flow field generator, whether on-board or off-board the UAV, may receive data from sensors associated with the UAV (whether the sensors are on-board, off-board, or any combination thereof), which may be used to generate an optical flow field.

The sensor data may optionally include information about the spatial disposition of the camera (e.g., coordinates, translational position, height, orientation), or movement of the camera (e.g., linear speed, angular speed, linear acceleration, angular acceleration). The sensor data may be able to detect a zoom state of the camera (e.g., focal length, how far zoomed in or out). The sensor data may be useful for calculating how a FOV of the camera may change.

An encoding processor 150 may be provided in accordance with embodiments of the invention. The encoding processor may be used to encode video that is captured by the video capture device. Examples of entropy coding tools include Huffman coding, run-level coding, and arithmetic coding. In examples discussed herein, context-adaptive variable-length coding (CAVLC) and context-adaptive binary arithmetic coding (CABAC) may be used in H264.

Additionally, the encoding processor may use an optical flow field that is associated with the video. In particular, the optical flow field may be used to efficiently encode the video. The encoding processor may receive the optical flow field information and use the optical flow field information to encode the video.

The encoding processor may include one or more processors that may encode the video. The encoding processor may be separate from the optical flow field generator, or may be the within the same component as the optical flow field generator. The encoding processor may include one or more processors that do not overlap with one or more processors of the optical flow field generator. Alternatively, one or more processors of the encoding processor may be the same as one or more processors of the optical flow field generator. In some instances, all processors of the encoding processor may be the same as the processors of the optical flow field generator.

The encoding processor may optionally be provided on-board the UAV. For instance, the encoding processor may be within the UAV body or arm, may be on-board the camera, or may be on-board a carrier supporting the camera. Alternatively, the encoding processor may be provided off-board the UAV. For instance, the encoding processor may be provided at a remote server, cloud computing infrastructure, remote terminal, or ground station. The encoding processor may be provided at a same or different location from the optical flow field generator.

Figure 2:
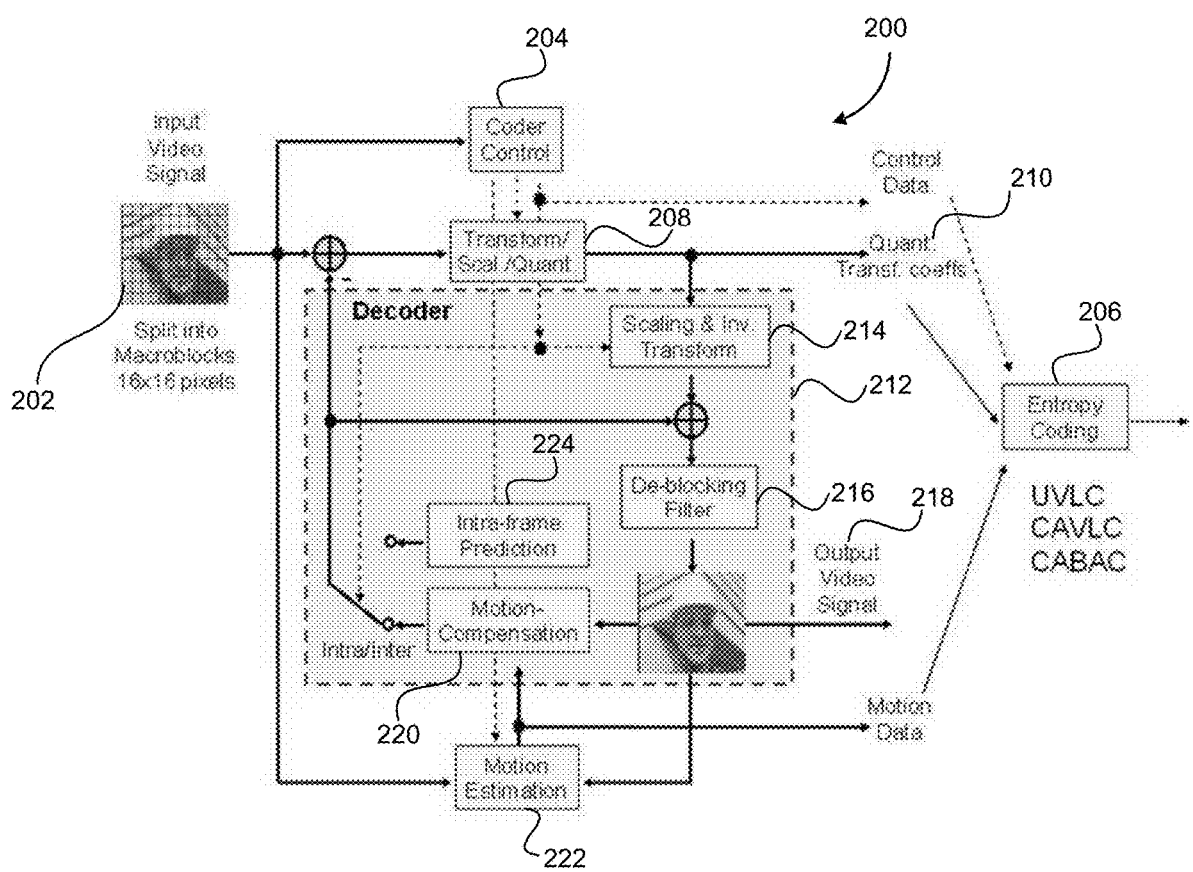
FIG. 2 illustrates a general process of video encoding, in accordance with embodiments of the present invention.

FIG. 2 illustrates a general process 200 of video encoding, in accordance with embodiments of the invention. When encoding video data, video frames of the video data may be initially split into blocks 202. These blocks may then be compressed based on intra frame data and/or inter frame data. Intra fame data is directed towards the spatial relationship between blocks within a frame. Conversely, inter frame data is directed towards the temporal relationship between blocks across video frames.

As seen in FIG. 2, an input video signal is received. The input video signal may be received from a video capture device. The video capture device may be supported by a support structure, such as a UAV. Additionally or alternatively, the input video signal may be received from an external device off-board the UAV. The received video may be split into macroblocks 202. Macroblocks may or may not have any overlapping portions. The video may be split into any number of macroblocks. For instance, the video may be split into an array of m×n macroblocks, where m has a value of 1 or more, 2 or more, 3 or more, 4 or more, 5 or more, 6 or more, 7 or more, 8 or more, 9 or more, 10 or more, 12 or more, 15 or more, 16 or more, 18 or more, 20 or more, 25 or more, 30 or more, 40 or more, 50 or more, 60 or more, 70 or more, 80 or more, 90 or more, 100 or more, 120 or more, 150 or more, 200 or more, 250 or more, or 300 or more, and n has a value of 1 or more, 2 or more, 3 or more, 4 or more, 5 or more, 6 or more, 7 or more, 8 or more, 9 or more, 10 or more, 12 or more, 15 or more, 16 or more, 18 or more, 20 or more, 25 or more, 30 or more, 40 or more, 50 or more, 60 or more, 70 or more, 80 or more, 90 or more, 100 or more, 120 or more, 150 or more, 200 or more, 250 or more, or 300 or more. The macroblock may have a rectangular shape, square shape, circular shape, or any other shape. In one embodiment, a macroblock may have a dimension of 16×16 pixels. The macroblock may have any dimension, such as p×q pixels, where p has a value of 1 or more, 2 or more, 3 or more, 4 or more, 5 or more, 6 or more, 7 or more, 8 or more, 9 or more, 10 or more, 12 or more, 15 or more, 16 or more, 18 or more, 20 or more, 25 or more, 30 or more, 32 or more, 40 or more, 50 or more, 60 or more, 64 or more, 70 or more, 80 or more, 90 or more, 100 or more, 120 or more, 128 or more, 150 or more, 200 or more, 250 or more, 256 or more, or 300 or more, and q has a value of 1 or more, 2 or more, 3 or more, 4 or more, 5 or more, 6 or more, 7 or more, 8 or more, 9 or more, 10 or more, 12 or more, 15 or more, 16 or more, 18 or more, 20 or more, 25 or more, 30 or more, 32 or more, 40 or more, 50 or more, 60 or more, 64 or more, 70 or more, 80 or more, 90 or more, 100 or more, 120 or more, 128 or more, 150 or more, 200 or more, 250 or more, 256 or more, or 300 or more. In the modern video coding standard, a video frame having a resolution of 720P or 1080P may be encoded by first dividing the video frame into small blocks. For H.264, the block size may be 16×16 pixels and for HEVC, the block size may be 64×64. Each macroblock may have the same dimension and/or shape. Alternatively, two or more macroblocks may have differing dimensions and/or shapes. A macroblock may also be referred to as a 'block.'

A video encoder may be used to remove the correlation of the blocks spatially and/or temporally. As such, after a video frame is divided into small blocks, the blocks of video data may go through a video encoding architecture as provided in FIG. 2.

In particular, the video data may proceed to a coder control 204. The coder control may be used to determine whether to encode the video data directly, e.g. without any additional transformation steps, or whether to send the data to a transformation/scaling/quantization (TSQ) component. In examples, the coder control may pass the video data directly to an entropy coding component 206. In other examples, the coder control may pass the video data to a TSQ component 208 prior to providing the transformed data to the entropy coding component. At the TSQ component, the video data may be transformed so as to compress similarities between spatially and temporally related video frame components, such as blocks. This process may use video from the original input video signal. Additionally, this process may utilize previously encoded video data so as to make the transformation process more efficient. Additionally, this compression process may result in quantization and transformation coefficients 210 which may then be provided to the entropy encoding component.

When transforming the video data, the video data may be processed in view of previously transformed video data that is re-evaluated at decoder 212 and that is provided as feedback to the TSQ component. In particular, video compression feedback may be generated by providing transformed video data from the TSQ component to scaling and inversion transformation (SIT) component 214. At the SIT component, the transformation process of the video data may be reversed. This video data may then be provided to a de-blocking filter 216 which may be used to generate an output video signal 218. The output video signal may then be used as a component to generate motion compensation factors at motion compensation component 220.

In examples, the motion compensation component may use motion data from an output video signal as well as motion data that is generated from motion estimation component 222. In particular, the motion estimation component may receive input video data from the initial input video signal. The motion estimation component may then generate motion data based on the video data. This motion data may then be provided to the motion compensation component and the entropy coding component.

Once the decoded video data is provided and contextualized based on motion data from the motion compensation component, the video data may be evaluated for intra frame prediction using intra-frame prediction component 224. Additional predictions may also be generated for inter-frame predictions. These predications may be provided as feedback for both the TSQ component as well as the de-blocking filter. As such, the quantization and transformation coefficients that are generated from the TSQ component, as well as the output signal that is generated by the de-blocking filter, may be refined based on feedback from processed video data.

As such, a video encoder may be used to simplify duplicate information, both between blocks of different video frames (temporal compression) as well as between blocks within the same video frame (spatial compression), so as to condense information. Once the video data is condensed, the video frames that are encoded utilizing the architecture in FIG. 2 may be formed into a 1-D bitstream.

Intra coding may be used to condense spatial correlations. For a block within a video frame, a predictor of pixel values within the block may be estimated from its neighboring pixels. For example, a predictor of pixel values may be estimated from neighboring pixels such as the upper, left upper right, and lower left neighboring pixels. Examples of these predications may be directional so as to correspond with the pattern within a pixel block. A demonstration of H.264 directional intra prediction is provided in FIG. 3.

Figure 3:
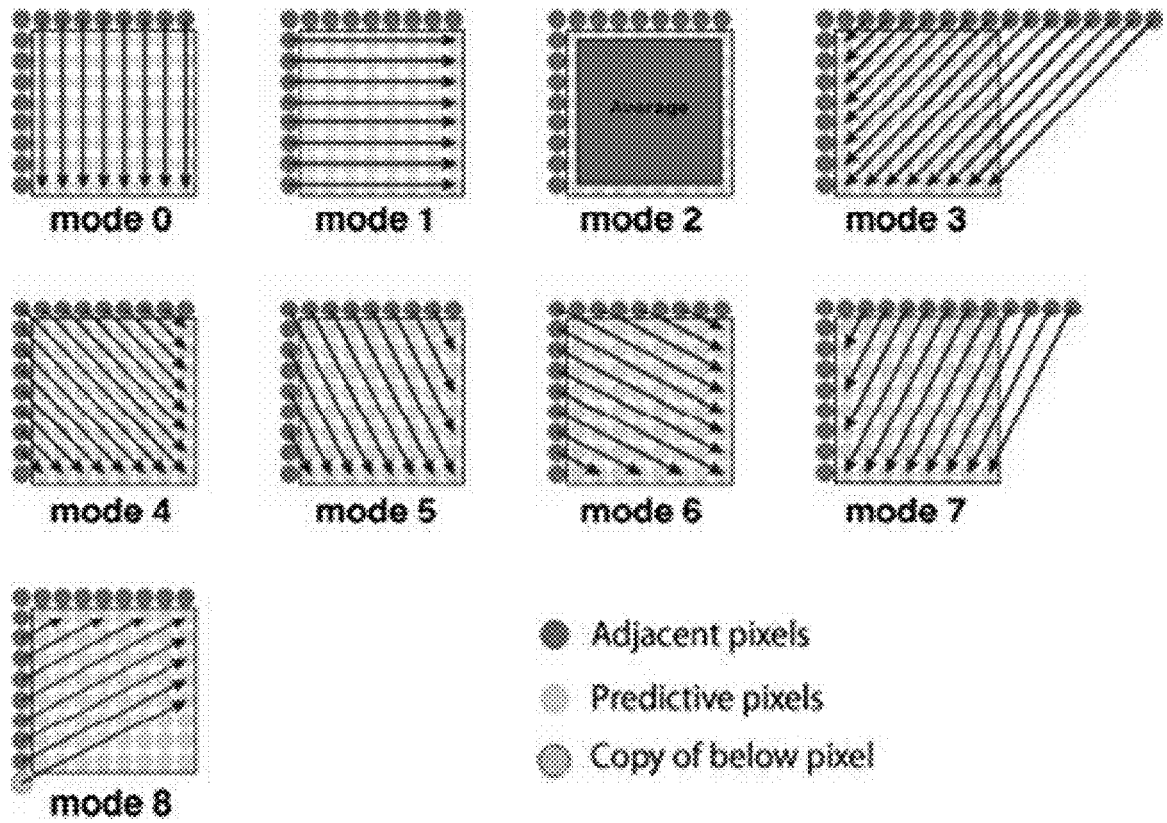
FIG. 3 illustrates examples of intra coding of pixels within a block in a video frame component, in accordance with embodiments of the invention.

FIG. 3 illustrates examples of intra coding of pixels within a block in a video frame component, in accordance with embodiments of the invention. As seen in FIG. 3, pixels that are adjacent to a block may be used to predict motion of pixels within the block. In particular, when intra coding is used, the pixels adjacent to a block are assessed for motion data. In FIG. 3, the pixels that are assessed are in a column to the left of the block and in a column above the block. The assessed motion of the blocks may be associated with a particular mode that is used by an encoding processor. As all of the adjacent pixels may not have the same motion information, a mode of assessed motion may be assigned to a block when the adjacent pixels have a threshold number of pixels being associated with a particular mode. In examples, the adjacent pixels may be assigned to a particular mode when any of 100%, 95% or more, 90% or more, 85% or more, 80% or more, 75% or more, 70% or more, 65% or more, 60% or more, 55% or more, over 50%, 50%, or a majority of adjacent pixels are associated with a particular mode.

Additionally, the mode that is assigned to the adjacent pixels may be used to determine the predictive motion of the pixels in the block. For example, in mode 0, the pixels that are adjacent to a block may be assessed as having a downward motion. As seen in FIG. 3, this downward motion may be used to predict a downward motion through the predictive pixels. As provided in FIG. 3, the downward motion through the predictive pixels is entirely based on the assessed motion of the upper column of adjacent pixels above the block.

In mode 1, the pixels that are adjacent to a block may be assessed as having a sideways motion. As seen in FIG. 3, this sideways motion may be used to predict a motion to the right throughout the predictive pixels. As provided in FIG. 3, the sideways motion through the predictive pixels is entirely based on the assessed motion of the left column of adjacent pixels next to the block.

In mode 2, the pixels that are adjacent to the block may be assessed as having a normal, or neutral, movement. Based on this assessment, the pixels within the block may be assessed to have a neutral movement as well. In examples, pixels within the block may be assessed to have a neutral movement when the objects that are captured within the video capture device are not moving; when objects that are captured within the video capture device do not appear to moving because the movement of an object is equal to that of a moving image capture device; or when objects that are captured within the video capture device do not appear to be moving because the objects are so far away that incremental movements made in relation to the far-away objects appear to be against a backdrop that is relatively still.

In mode 3, the pixels that are adjacent to a block, and in close proximity to the upper portion of the block, may be assessed as having a leftward angled motion. As seen in FIG. 3, this leftward angled motion may be used to predict a motion to the downward left throughout the predictive pixels. As provided in FIG. 3, the downwardly sideways motion through the predictive pixels is entirely based on the assessed motion of the upper column of adjacent pixels next to the block, as well as an upper column of pixels that are in close proximity to the block. Similarly, in mode 7, the pixels that are adjacent to the block may also be assessed as having a downward leftward angled motion. However, the angle of the downward leftward angled motion as seen in mode 7 may be steeper than the downward angled motion as seen in mode 3.

In mode 4, the pixels that are adjacent to the block may be assessed as having a rightward angled motion. As seen in FIG. 3, this rightward angled motion may be used to predict a motion to the downward right throughout the predictive pixels. Similarly, in mode 5 the pixels that are adjacent to the block may also be assessed as having a rightward angled motion, though the angled motion as illustrated in mode 5 is steeper than the angled motion in mode 4. Additionally, in mode 6 the pixels that are adjacent to the block may also be assessed as having a rightward angled motion, though the angled motion as illustrated in mode 6 is more shallow than the angled motion in modes 4 or 5.

Additionally, mode 8 provides adjacent pixels to a block that indicate a motion that is upwards and to the right. However, mode 8 differs from previous modes in that mode 8 is only able to predict a portion of the block. For assessing the additional predictive pixels within the block, other auxiliary methods may be used.

While intra coding utilizes neighboring pixels of a block, such as pixels on the left column and the upper row of a current block, there may be a significant amount of residual information that is included within the central pixels of a block. In examples, the central pixels of a block may include textures, objects, and other information that may not be readily predicted using intra coding. To capture this information, information between frames (e.g. temporal compression) may be condensed and encoded.

Inter coding may be used to condense temporal correlations. For a block within a video frame, a predictor of pixel values within the block may be estimated from a correlating block within a previous frame. As video frames may only be separated by a few millionths of a second, blocks between frames may not generally differ greatly. However, the use of inter coding may be useful for predicting details within a block that would not be captured using intra frame coding. In particular, these details are predicted by referencing block from nearby video frames. In particular, blocks that are correlated between frames may be linked using a motion vector.

When implementing inter coding, initially an inter frame motion estimation may be performed on the encoding block. The motion estimation process may determine a grid of pixels which may be considered most similar and most costless to a current block. In particular, the motion estimation may determine the grid of pixels that is considered most similar by conducting a search within a search area of a video frame. Once a grid of pixels which is considered the most similar and most costless to the current block is determined, a motion vector may be calculated. In particular, the motion vector may be calculated as comprising the 2D pixel location difference between the current block of a first frame and its reference block of a video frame that is temporally related to the first frame. In examples, the 2D pixel location difference may use subpixel interpolation so as to define motion between frames by integer pixels, half pixels, quarter pixels, etc. An illustration of calculating a motion vector is illustrated in FIG. 4.

Figure 4:
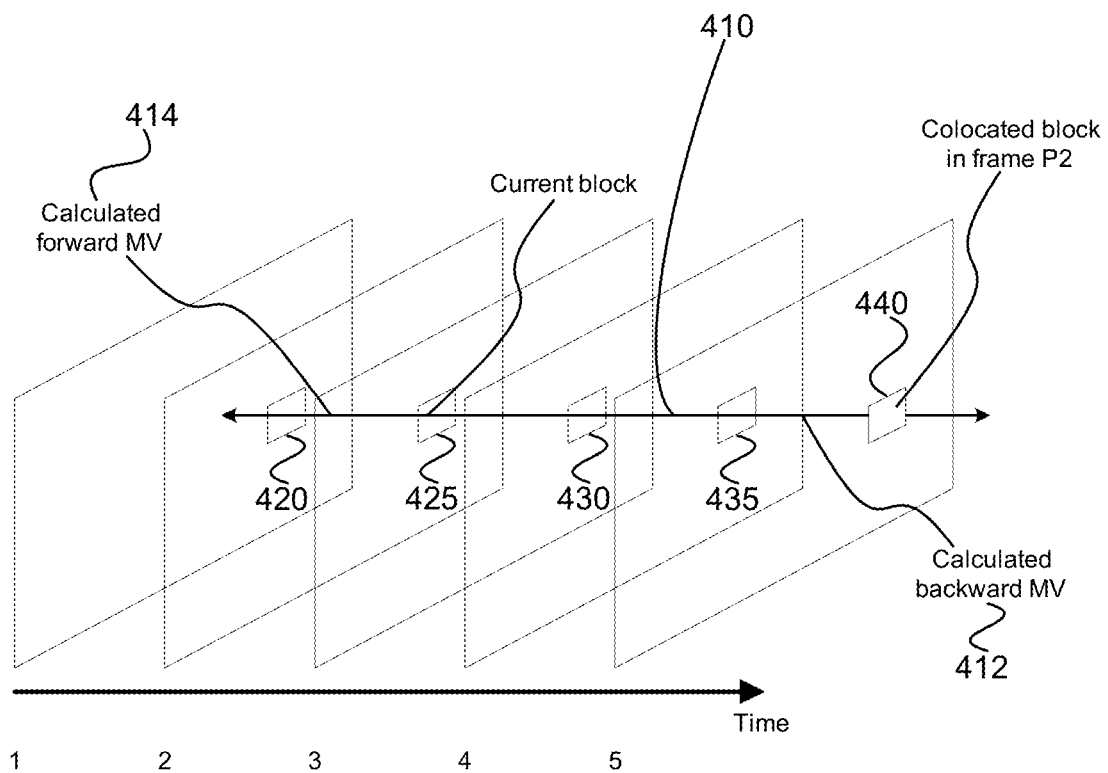
FIG. 4 illustrates motion vectors linking co-located blocks across video frames, in accordance with embodiments of the invention.

FIG. 4 illustrates motion vectors linking co-located blocks across video frames, in accordance with embodiments of the invention. As seen in FIG. 4, a motion vector 410 may link blocks 420-440 across video frames. In particular, the blocks 420-440 form an illustration of a portion of the video data that is associated with a series of video frames. Using the motion vector, a calculated motion vector may be predicted from neighboring and/or nearby video frames, even if those neighboring video frames are ahead in time, as illustrated by calculated backward motion vector (MV) 412 and calculated forward MV 414. This may be due to the compression of information between inter coding. In particular, during inter coding, temporal information may be compressed, particularly by linking blocks together using motion vectors and other relational information.

Once a motion vector is determined, the motion vector may be provided to a decoder side within the encoding system. When the decoder receives this information, the decoder may find a corresponding location of a first block on a reference frame that may be linked to a block that is being processed. In this way, the motion vector may be used by the decoder to find a reference. Subsequently, the difference between the reference and the current block (e.g., the motion vector) may be processed and transmitted.

Header information coding may also be used to efficiently encode video data. In particular, header information that is related to a motion vector and header information that is related to a skip mode may be used to encode video data that is captured by a UAV.

Regarding motion vectors, a current block and its spatial neighboring block within the same video frame may have a high probability of sharing the same motion vectors. Moreover, the motion vector temporally corresponding to a current block may also serve as a predictor of the motion vector of the current block. As such, a motion vector predictor (MVP) for a current block may be calculated based on a current block's spatially and temporally neighboring blocks. The calculation of a MVP may depend on the standards of an encoding processor.

Additionally, regarding a skip mode, additional information that is within a header of a current block may also be predicted from neighboring blocks. Further, in examples where a current block may be fully predicted from its neighboring blocks, the header of the current block may be marked as a skip block. In particular, a skip block may be used to indicate that no residual information is transmitted. In examples, a skip may be used when the information within the current block may be calculated based on the information of blocks that neighbor the current block.

As referenced briefly, the difference between an original block and its predictor may be called the residual. In examples, the residual between blocks may be represented as a coefficient. In examples, this residual coefficient may be directly encoded.

In other examples, even after a residual coefficient has been calculated, the residual coefficient may have some spatial redundancy that may be able to be removed. In examples, a transformation may be used to concentrate the energy to low frequency. The concentrated energy may lose less when the video encoding undergoes a processing step which uses lossy compression tools within whatever standard, quantization. For example, if ten numbers [1,1,1,1,1, 1,1,1,1,1], are quantized with 10, the ten numbers would become 0, thus causing an error rate of 100%. In contrast, if a transform is applied, the ten numbers would become [10,0,0,0,0,0,0,0,0,0]. If that result is then quantized with 10, nothing is lost, thereby having an error rate that is 0%. This is useful as quantization is a useful lossy compression tool. As such, controlling the quantization parameter may allow control of bitrates of whole streams of data.

Figure 5:
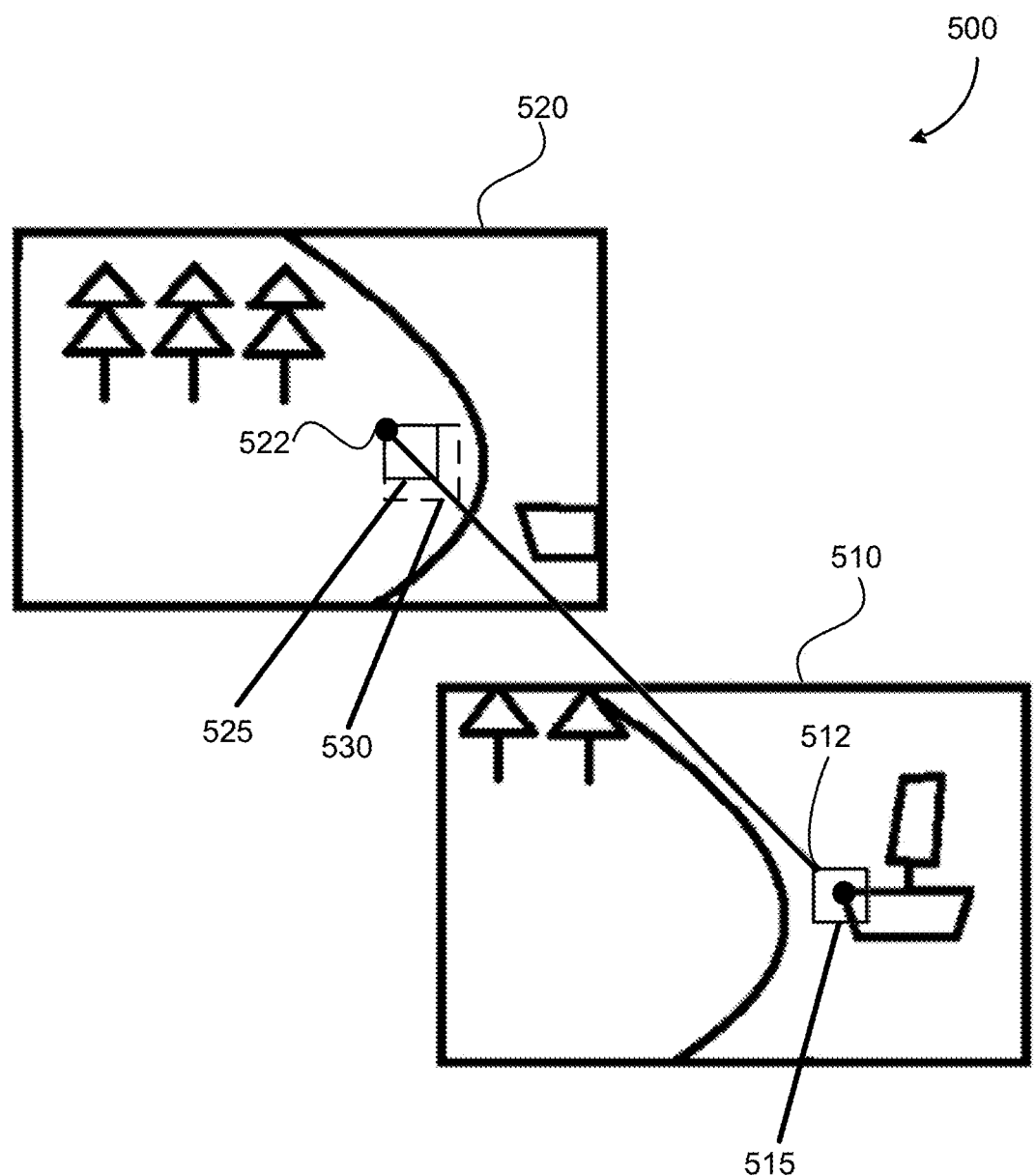
FIG. 5 illustrates a structure of search areas provided for encoding blocks between frames as provided in the prior art.

While a video encoding process is generally discussed in FIG. 2, embodiments of the invention are directed towards methods of efficiently determining a motion vector between blocks. In particular, embodiments of the invention are directed towards modifying search areas that are used to identify motion vectors within video that is encoded by an encoding processor. As such, FIG. 5 provides an example of a motion estimation process 500, in accordance with embodiments of the present invention. In particular, FIG. 5 illustrates two video frames within a video that is captured by a video capture device. The two video frames include objects such as trees, a coast, and a boat. In particular, a first frame 510 may be a currently encoded frame and a second frame 520 may be a predictive frame. Additionally, a block 515 of the first frame, which is a currently encoded frame, may be associated with a motion vector (not shown). In particular, the motion vector may be used to link block 515 to a block within the second frame, which is adjacent to the first frame. In some cases, a block that is within a first frame may share a motion vector with a block that is co-located on an adjacent frame. In particular, co-located blocks may be linked blocks that share matching coordinates within a frame or across a frame.

Accordingly, when searching for the motion vector that links block 515 to an associated block on the second frame, a block 525 of the second frame that co-located with block 515 of the first frame may be identified. Block 525 may be used to define a search area 530 when searching for a motion vector that links block 515 of the first frame to a block within the second frame. In particular, search area 530 is based on an initial search point 522 at the top left corner of the co-located block, and then extends downwards and to the right of the co-located block so as to cover the area within the co-located block as well as additional area that may also be searched. In examples, the search area may extend downwards and to the right; downwards; downwards and to the left; to the left; upwards and to the right; upwards; upwards and to the left; to the right; or to a combination of these directions relative to an initial starting point. In examples, a starting point may be on a corner of the block or within the block, such as a center of the block. The search area may cover an entirety of the block, cover a portion of the block, overlap with the block, or may at least partially not overlap with the block.

When evaluating the second frame 520 for a motion vector to link a second block with the encoded first block 515, the search area 530 on the second frame 520 may be assessed. In particular, a motion estimation predication may be formed between a first video frame, 510, that has already been coded (also referred to as "coded(510)") and a second, adjacent frame, 520, so as to form a prediction of 520 (also referred to as "pred(520)"). The adjacent frame, 520, may or may not be encoded. Additionally, the adjacent frame, 520, may be the frame captured immediately after the first video frame, 510, in the video. In some embodiments, the first video frame, 510, may be compared with a subsequent frame, xt, which may or may not be the adjacent frame. The subsequent frame may be the adjacent frame (t=1), or may be the frame immediately after the adjacent frame (t=2), or any frame afterwards (e.g., t=3, 4, 5, 6, 7, 8, 9, 10, or more). In some instances, the subsequent frame may be suitably close in time to the first frame to make a prediction of the next frame "pred(xt)." For instance, t may be 50 or less, 40 or less, 30 or less, 20 or less, 10 or less, 7 or less, 5 or less, 3 or less, 2 or less, or 1. The subsequent frame may be captured within less than 5 seconds of the first frame. In examples, the subsequent frame may be captured within less than 5 seconds, less than 4 seconds, less than 3 seconds, less than 2 seconds, less than 1 second, less than 0.9 seconds, less than 0.8 seconds, less than 0.7 seconds, less than 0.6 seconds, less than 0.5 seconds, less than 0.4 seconds, less than 0.3 seconds, less than 0.2 seconds, less than 0.1 seconds, less than 0.05 seconds, and less than 0.01 seconds.

Any description herein of the adjacent frame, 520, may also apply to a subsequent frame, xt. This motion estimation prediction may be illustrated between the encoded frame 510 and the predicted frame 520 as seen in FIG. 5. In examples, a motion estimation prediction may be generated by evaluating each block of a plurality of blocks within adjacent frame, 520, with their correlating blocks on first video frame, 510. In some instances, each and every block of a frame may be evaluated. Alternatively, a subset of the blocks of the frame may be evaluated. In some instances, a subset of representative blocks may be selected from the plurality of blocks in the frame, and may be evaluated. In some instances, alternating blocks may be selected. In some instances, blocks may be selected based on their position, image content, or any other factors.

For conventional video encoding processes, an assumption is made that the block on first video frame, 510, that correlates with an associated block within the adjacent frame, 520, is located within the same area of the frame. As such, a standard search area may be generated around a block that is co-located with an already encoded block of a temporally adjacent video frame. An example of a standard search area that is generated around a co-located block is illustrated as search area 530 in FIG. 5. However, even when there is a search area, such as search area 530, that surrounds a co-located block, such as co-located block 525 of second frame 520, the motion vector that is associated with the co-located block 515 of the already coded frame 510 may be outside of the given search area. This is the case in FIG. 5, where the boat that is associated with block 515 that is already encoded on video frame 510 is already out of the search area 530 of co-located video frame 525 on second video frame 520.

However, the search area provided in FIG. 5 may be useful in that the search structure that is provided in FIG. 5 may be used to determine an initial starting point for evaluating a search area in accordance with embodiments of the invention. As such, FIG. 5 illustrates a structure of search areas provided to determine an initial search area for encoding blocks, in accordance with embodiments of the invention. As seen in FIG. 5, an initial search point for a search area 530 associated with a block of adjacent frame, 520, is at a point 522 that is co-located between frame 520 and point 512 of frame 510. While a search area 530 is provided, the search area may be of a standard size and shape. In particular, a standard size of a search area may comprise m×n pixels, where m has a value of 1 or more, 2 or more, 3 or more, 4 or more, 5 or more, 6 or more, 7 or more, 8 or more, 9 or more, 10 or more, 12 or more, 15 or more, 16 or more, 18 or more, 20 or more, 25 or more, 30 or more, 40 or more, 50 or more, 60 or more, 70 or more, 80 or more, 90 or more, 100 or more, 120 or more, 150 or more, 200 or more, 250 or more, or 300 or more, and n has a value of 1 or more, 2 or more, 3 or more, 4 or more, 5 or more, 6 or more, 7 or more, 8 or more, 9 or more, 10 or more, 12 or more, 15 or more, 16 or more, 18 or more, 20 or more, 25 or more, 30 or more, 40 or more, 50 or more, 60 or more, 70 or more, 80 or more, 90 or more, 100 or more, 120 or more, 150 or more, 200 or more, 250 or more, or 300 or more. The standard size of a search area may have a rectangular shape, square shape, circular shape, or any other shape. In one embodiment, a standard size of a search area may have a dimension of 16×16 pixels.

Further, the size and shape of the search area may be independent of the motion estimation prediction between frame 510 and frame 520. In conventional motion estimation evaluation processes, once the initial search point, such as search point 522, and search area, such as search area 530, has been determined for frame 520, the motion estimation predication may evaluate the pixels or subpixels of the search area to identify the pixels or subpixels that are most similar to the block within first frame 510. In examples, the similarity of the block on frame 520 to its corresponding block on frame 510 may be estimated by an equation. For example, the similarity of corresponding blocks of frames 510 and 520 may be illustrated by an equation that shows a block of first frame 510 has a corresponding block that is a certain distance from a corresponding block on the adjacent frame 520.

Figure 6:
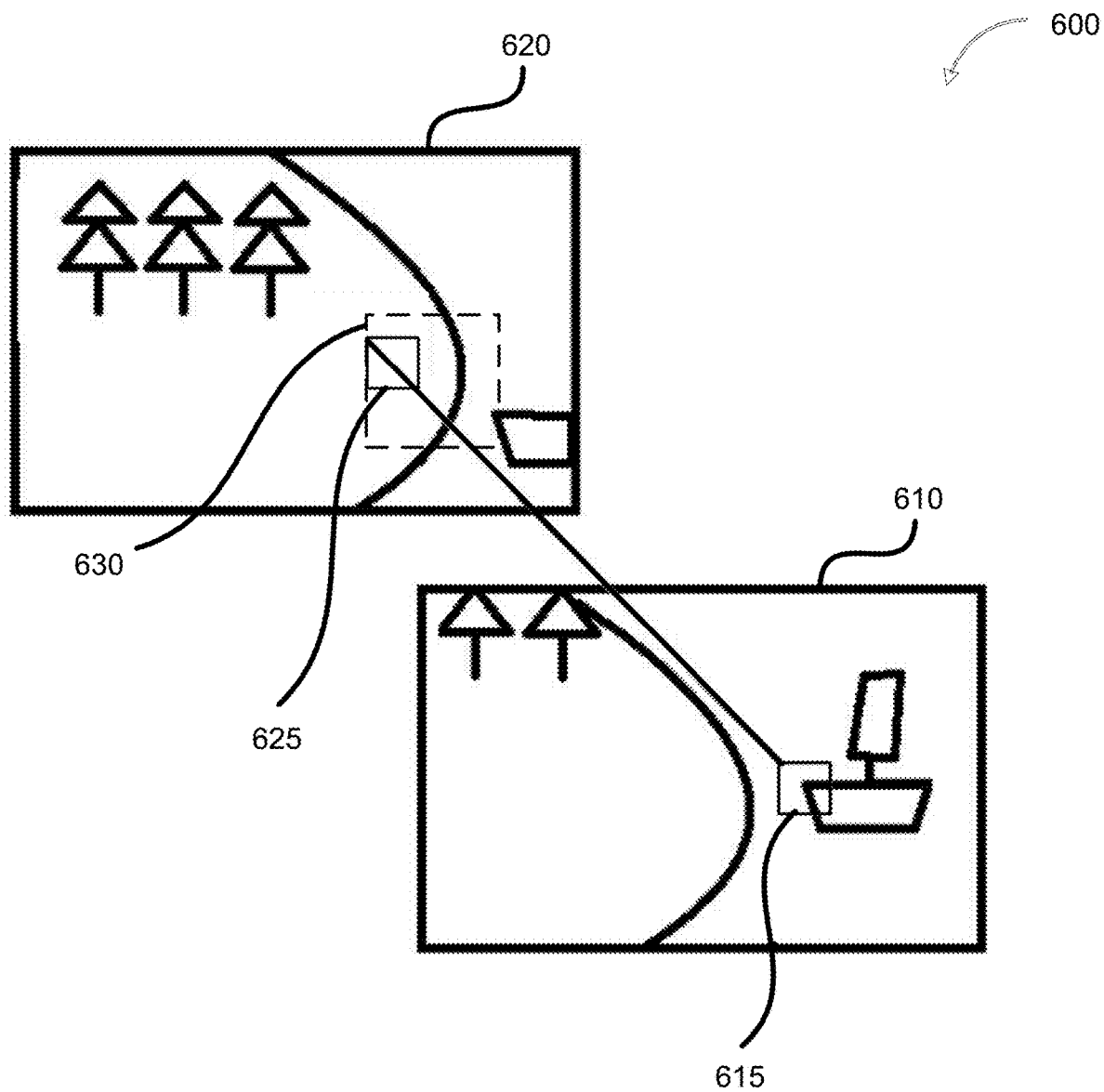
FIG. 6 illustrates a structure of modifying search areas provided for encoding blocks between frames, in accordance with embodiments of the invention.

In order to avoid the incorrect association of a block within a first frame and a block within a second, adjacent frame, FIG. 6 illustrates a structure 600 of modifying search areas provided for encoding blocks between frames, in accordance with embodiments of the invention. In particular, FIG. 6 illustrates two video frames within video that is captured by a UAV. The two video frames include objects such as trees, a coast, and a boat. In particular, a first frame 610 is a currently encoded frame and second, adjacent frame 620 is a predictive frame. Any description of a second or adjacent frame may apply to any subsequent frame. Additionally, a block 615 of the currently encoded frame is associated with a particular motion vector.

As discussed herein, FIG. 6 provides an example of modifying the search area associated with a block of adjacent frame 620 so as to increase the chances of the motion estimation prediction evaluation to identify the motion vector that corresponds to the block within the second frame. When evaluating frame 620 for a motion vector to link block 625 with encoded block 615, a search area 630 may be assessed. In particular, an encoding processor may receive an indication that there is a large amount of motion within the video data. [Inventors: what are ways that the encoding processor may receive this indication?] In this case, the encoding processor may increase the size of the search area associated with a block of frame 620. This is illustrated in FIG. 6, where the search area 630 is larger than a respective search area 530 that is provided in FIG. 5. In other examples, the search area may be reshaped, may be stretched in a given direction, or may be moved to a new location. Additionally, the search area 630 of FIG. 6 succeeds in capturing the corner of a boat in the second, adjacent frame 620 similar to the corner of the boat within a block of the first frame 610.

Accordingly, the encoding processor may adjust the size of a search area associated with a block of frame 620 by analyzing an optical flow field that is generated based on sensor information associated with the UAV. In particular, the optical flow field may be generated based on motion of the camera. Additionally, the optical flow field data may be indicative of an adjustment of a FOV setting of a video capture device, such as a camera. Examples of how an optical flow field may adjust based upon movement of the video capture device and/or movement of an aerial vehicle is provided in FIGS. 7-11.

In examples, the encoding processor may increase the size of the search area by 0.1%, 0.2%, 0.3%, 0.4%, 0.5%, 0.6%, 0.7%, 0.8%, 0.9%, 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, 80%, 85%, 90%, 95%, 100%, 120%, 140%, 160%, 180%, 200%, 250%, 500%, or more than 500%. Alternatively, the encoding processor may decrease the size of the search area by 0.1%, 0.2%, 0.3%, 0.4%, 0.5%, 0.6%, 0.7%, 0.8%, 0.9%, 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, 80%, 85%, 90%, 95%, 100%, 120%, 140%, 160%, 180%, 200%, 250%, 500%, or more than 500%.

Accordingly, the encoder may adjust the shape of a search area based on optical flow fields that are generated based on sensor data associated with the UAV. In examples, the search area may be a shape such as a circle, square, rectangle, triangle, rhombus, parallelogram, trapezoid, oval, ellipse, figure-8, or another shape.

The encoder may also move the search area to a new location. In particular, the encoder may move the search area from its initial starting position in a given direction. In examples, the encoder may move the search area to the left, to the right, up, down, or at an angle from the starting position of the search area.

Additionally, the encoder may adjust the dimensions of a search area based on optical flow fields that are generated based sensor data associated with the UAV. An optical flow field may describe the direction and/or velocity of points on a frame. In some examples, an optical flow field may describe the direction and velocity of all points on a frame. Sensors that are associated with the UAV may be used to generate an optical flow field. In particular, sensors that may be used for generating an optical flow field may include a GPS, a gyroscope, a MVO, the angle of the camera, height information, or any other sensors described herein.

While an increase in search area size, as seen in FIG. 6, may increase the likelihood that the motion vector associated with the block of frame 620 is found within the search area of block 620, this may additionally be a burdensome task to be placed on the motion estimator prediction component. As such, it may also be beneficial to move the initial search point that is associated with the block of frame 620.

Optical flow fields that are generated may be used by an encoding process to increase the accuracy of the initial motion vector. Accordingly, the size, shape, and/or location of a search area may be modified based on an optical flow field that is generated based on sensor data associated with the UAV. FIGS. 7-11 provide illustrations of optical flow fields that may be difficult to encode if the encoding processor had no knowledge of motion data within the video.

Additionally, FIGS. 7-11 provide illustrations of how search areas may be modified based on the optical flow fields.

Figure 7:
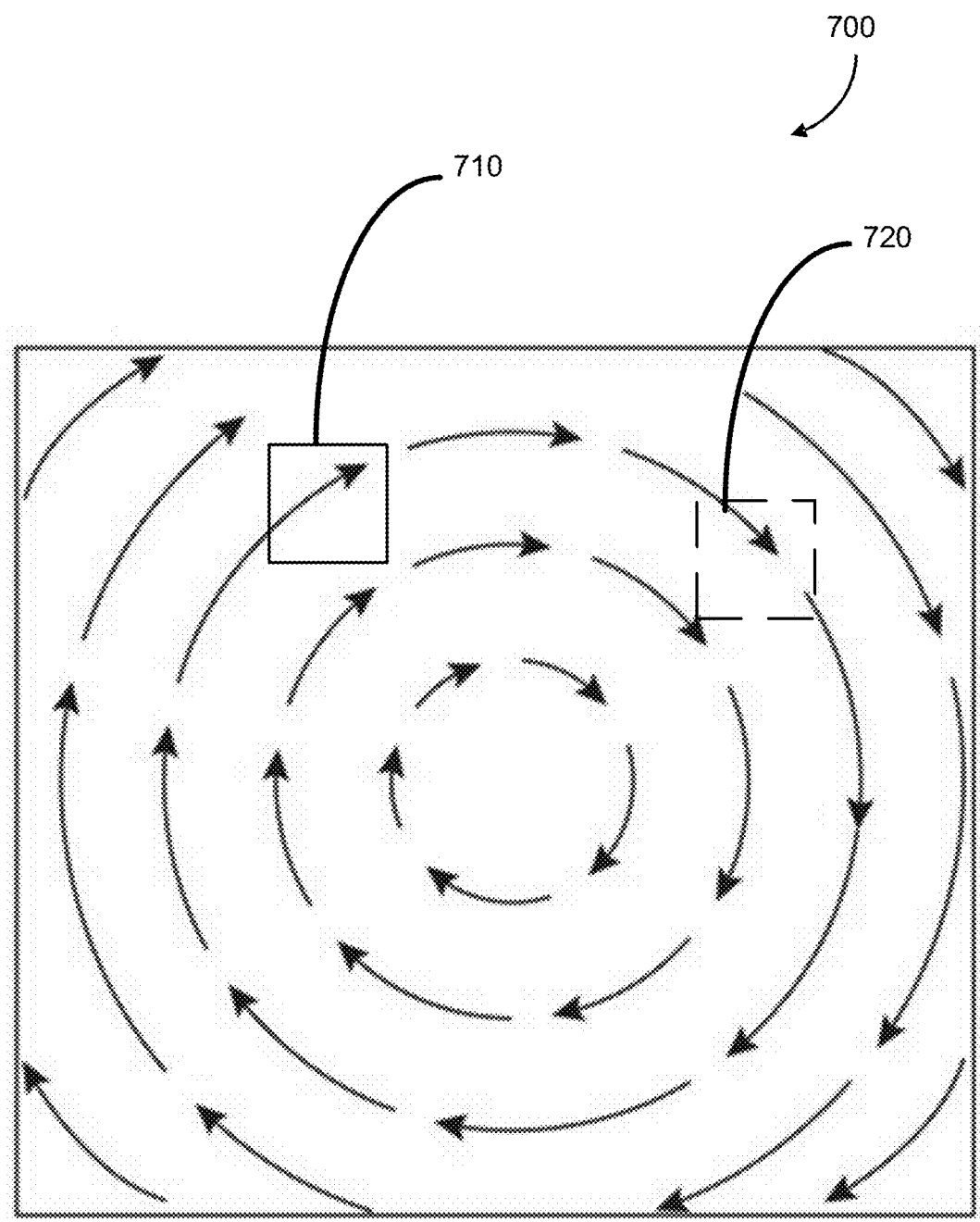
FIG. 7 illustrates an optical flow field that is associated with a rotating view from above, in accordance with embodiments of the invention.

An example of an optical flow field 700 is provided in FIG. 7. In particular, FIG. 7 illustrates an optical flow field that is associated with a rotating view from above, in accordance with embodiments of the invention. Motion within the optical flow field is indicated using arrows. The length of the arrows indicates the amount of movement that is occurring across the optical flow field, and the curve of the arrows indicates the direction of movement that is occurring across the optical flow field. Additionally, FIG. 7 provides an illustration of how an initial search area 710 may be modified based on the optical flow field 700. In particular, the initial search area may be translated along the curve of a motion arrow to the position of modified search area 720. In particular, the initial search area may be translated along the curve of a motion arrow based upon the speed at which the image capture device rotates with respect to the object or objects captured on video. Optical flow fields may be generated by rotating a video capture device about a roll axis, by rotating a UAV about a camera roll axis, or both. In additional examples, generated optical flow fields may include motion aspects related to the speed of moving objects, distance of moving objects from a video capture device, curving motion of moving objects, directionality of moving objects, and other characteristics of object movement within an optical flow field.

Additionally, the distance that the modified search area 720 is translated may be based on how fast the object seems to be moving relative to the video captured on the image capture device. This speed may be assessed based on the distance that is travelled of similar objects as contextualized by time stamps that are associated with the video frames. In this way, distance of object movement in context of timestamps (so, e.g., elapsed time) may indicate speed. Additionally, as provided in FIG. 7, modified search area 720 may be the same dimensions of the initial search area 710, but may be translated in accordance with the optical flow field.

Figure 8:
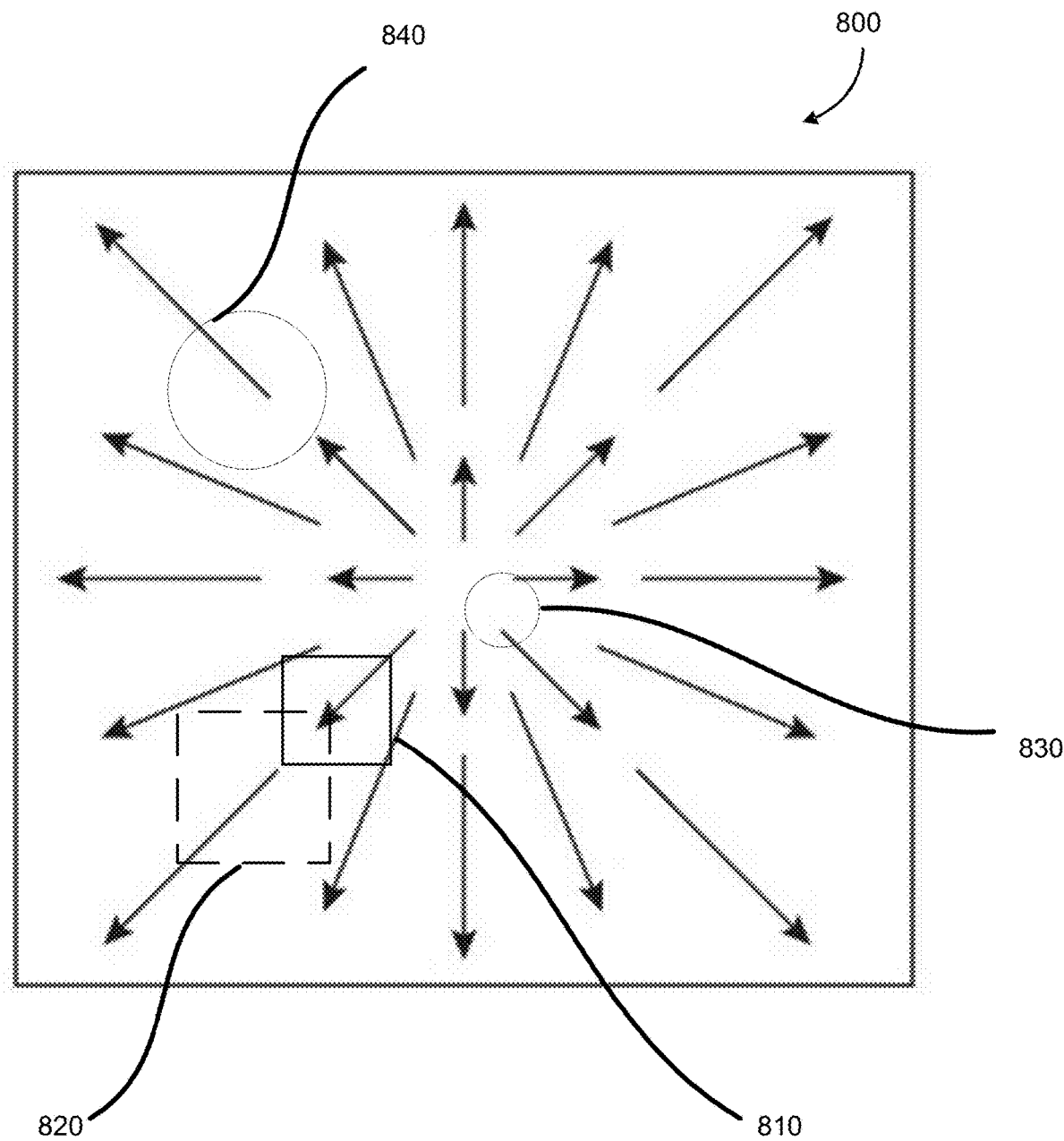
FIG. 8 illustrates an optical flow field that is associated with a zoom-in feature that is associated with a camera, in accordance with embodiments of the invention.

FIG. 8 also provides an example of an optical flow field. In particular, FIG. 8 illustrates an optical flow field that is associated with a zoom-in feature that is associated with a camera, in accordance with embodiments of the invention. In examples, the zoom-in feature may occur based on a video capture device zooming in on an object; based on the support area of an aerial vehicle that allows a camera to move in closer; or a combination of the two. As seen in FIG. 8, movement at the edge of the optical flow field is larger than movement at the middle of the optical flow field. Additionally, the directionality of the zoom-in is equal across the optical flow field. In other words, there is no apparent bias in a vertical or horizontal distance, as each direction is moving in a similar fashion. However, even when there is in a particular direction, a larger search area may be needed as the motion vector search area is translated to a portion of the optical flow field that is dense, such as the middle area of optical flow field 800, to a portion of the optical flow field that is less dense, such as the outer area of optical flow field 800. Accordingly, FIG. 8 illustrates an initial search area 810 that is closer to the center of the optical flow field, and a larger, modified search area 820 that is closer to the edge of the optical flow field.

The relationship of the perceived size of objects within an optical flow field may vary based on location of the objects within the optical flow field. For example, when an optical flow field is generated based on a zoom-in action, objects that are the same size in real life may appear to be larger as they are located further to the edge of the optical flow field. This is illustrated in FIG. 8, which illustrates a first ball 830 that is near a normalized minimum at the center of the optical flow field and a second ball 840 that is near a periphery of the optical flow field. Although first ball 830 and second ball 840 are of equal size, they appear to be of different sizes when viewed in context of the optical flow field. Accordingly, the perceived size of objects may vary across optical flow fields. In particular, the perceived size of objects may vary in a manner that is directly linear proportional, inversely proportional, or modeled by another equation as objects are placed at different locations across the optical flow field.

Figure 9:
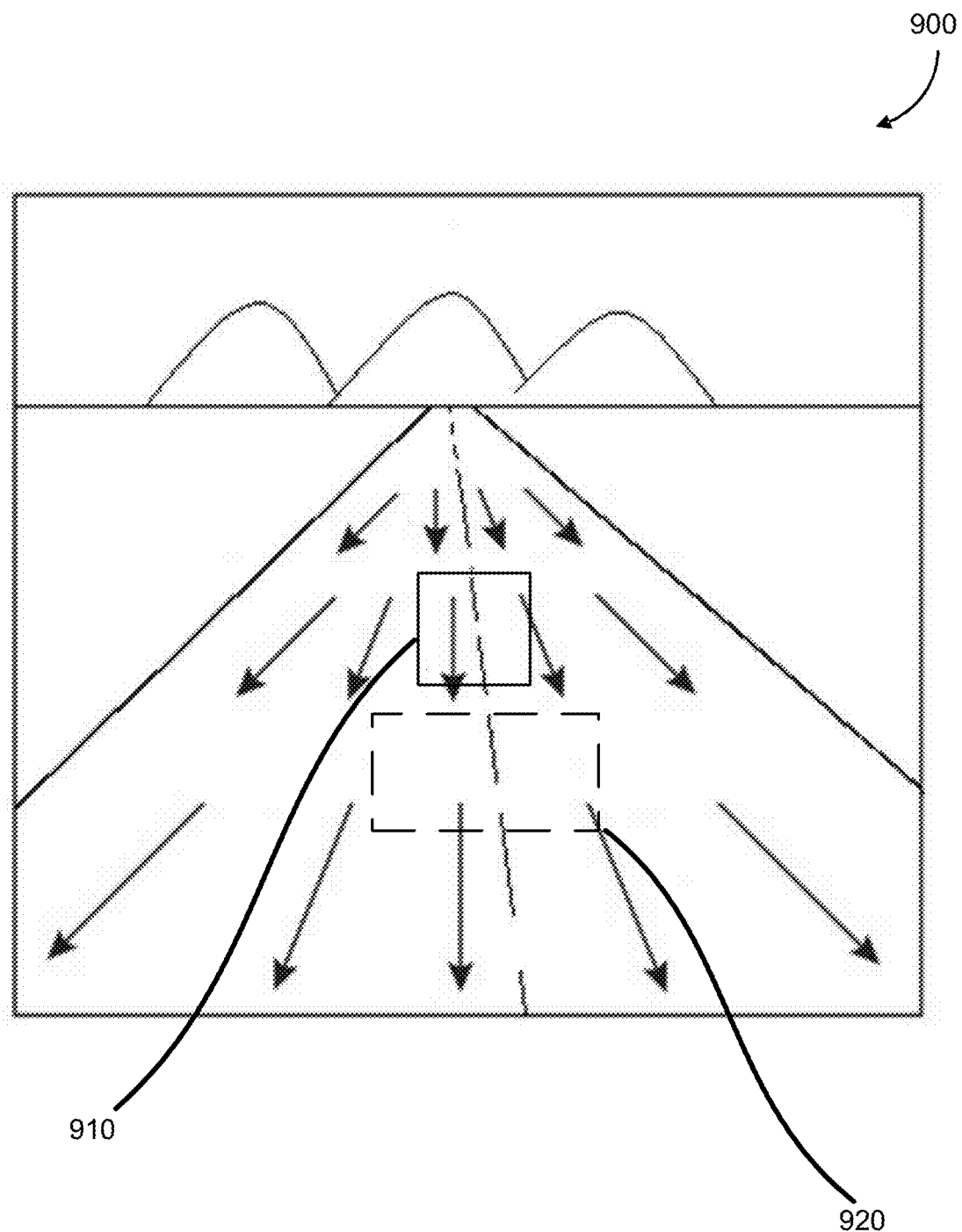
FIG. 9 provides a global optical flow field having different degrees object movement, in accordance with embodiments of the invention.

An example of an optical flow field that has different rates of movement associated with objects within a frame is provided in FIG. 9. In particular, FIG. 9 provides a global optical flow field 900 having different degrees of object movement, in accordance with embodiments of the invention. As seen in FIG. 9, some objects near the top of the optical flow field are relatively still. In particular, objects that seem to be relatively still may be far away from an image capture device, as object that are moving at the same speed will have differing perceived speeds based on the distance of the object from a video capture device. Alternatively, objects that are moving at a constant speed may appear to be relatively still if a video capture device is moving at the same speed and in the same direction as the objects. In example, the video capture device may be moving at a particular speed based upon movement of a UAV that attaches the video capture device. Alternatively, the video capture device may be moving at a particular speed based on the movement of the video capture device itself relative to a UAV to which it is attached.

In contrast, some objects that are in the central and lower part of the optical flow field are moving relatively fast. In particular, objects may seem to move relatively fast based on their movement relative to a video capture device. In particular, if a video capture device is moving quickly past a stationary object, the stationary object may seem to be moving quickly based on the movement of the video capture device. In examples, the perceived movement of objects may have a motion component that is associated with movement of the video capture device and/or may have a motion component that is associated with movement of a movable object, such as UAV, that attaches the video capture device. Additionally, FIG. 9 provides an example of how an initial search area 910 is able to be adjusted based on the optical flow field. In particular, a modified search area 920 is provided that has a horizontal bias. The horizontal bias of the modified search area is based on the horizontal expansion of motion arrows as provided in FIG. 9. The horizontal bias that is seen in FIG. 9 is due to a vertical zoom-in aspect that is seen as the video is capturing objects that are closer to the bottom edge of the optical flow field. As objects more down towards the bottom edge of the optical flow field, they appear to be getting larger. This is reflected in the broader expansion of motion arrows that are provided in the optical flow field. As such, when searching for a motion vector, a modified search area may be expanded in a horizontal direction so as to search a relatively comparable amount of area in a lower part of the optical flow field, where objects of the same size may appear to be larger, than in a higher part of the optical flow field, where objects of the same size may appear to be smaller.

Figure 10:
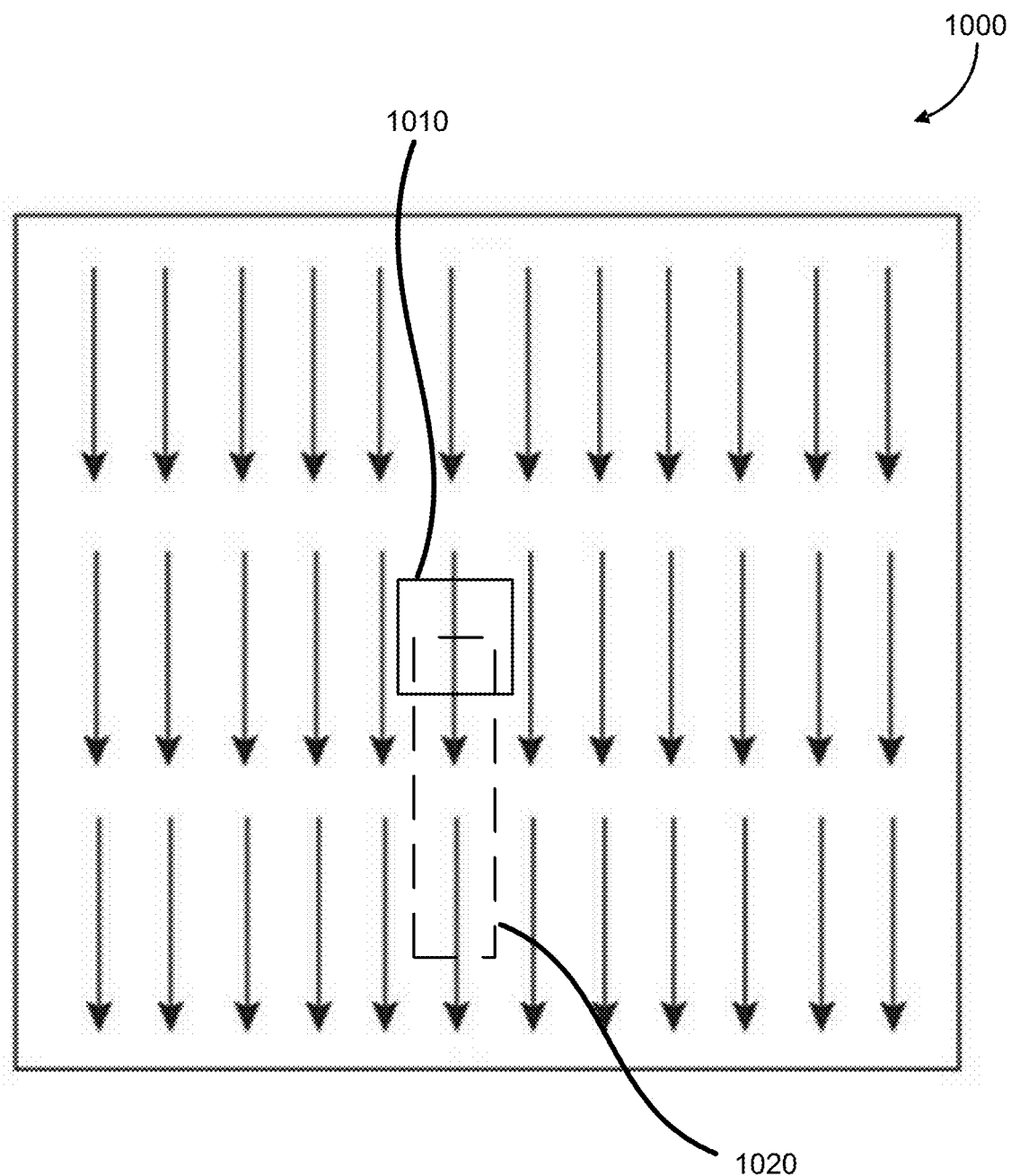
FIG. 10 illustrates an ultra-fast global camera motion, in accordance with embodiments of the invention.

FIG. 10 illustrates an ultra-fast global camera motion, in accordance with embodiments of the invention. In particular, the optical flow field 1000 that is provided in FIG. 10 has a uniformly downward direction. Additionally, the downward direction of motion arrows is illustrated as being fast due to a density of arrows. In examples, the downward direction of the optical flow field may appear to be fast in the video data based on one or more objects that are moving quickly past a video capture device. In other examples, the downward direction of the optical flow field may appear to be fast in the video data based on the movement of a video capture device relative to object within the captured video data. In further examples, the downward direction of motion arrows within the optical flow field may appear to be fast in the video data based on a combination of the objects that are moving quickly past the video capture device and the fast movement of the video capture device itself.

FIG. 10 also illustrates an initial search area 1010 that is adjusted based on the vertical motion provided in the optical flow field 1000. In particular, the optical flow field of FIG. 10 has a vertical bias. As such, a modified search area 1020 may be taller than an initial search area 1010. In particular, the modified search area 1020 may be given additional height so as to increase the probability of identifying a motion vector that correlates to a motion vector found in a block co-located with initial search area 1010.

Figure 11:
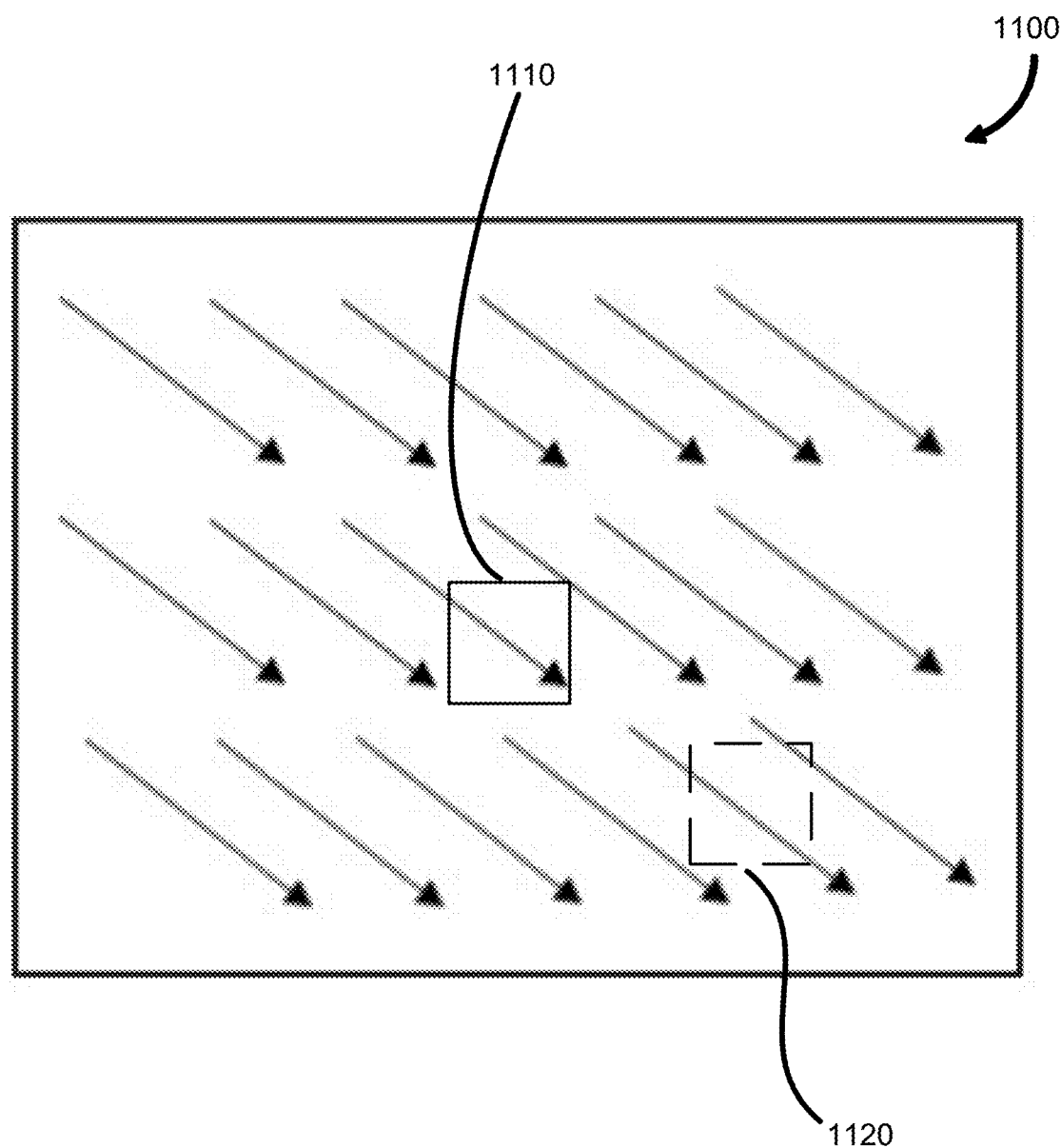
FIG. 11 illustrates an angled global motion, in accordance with embodiments of the invention

Additionally, FIG. 11 illustrates an angled global motion, in accordance with embodiments of the invention. In particular, the optical flow field 1100 that is provided in FIG. 11 has a uniformly angled direction towards the bottom right corner of the optical flow field. In examples, the direction of motion arrows within the optical flow field may appear to be angled in the video data based on one or more objects that are moving at an angle past a video capture device. In other examples, the direction of motion arrows within the optical flow field may appear to be angled in the video data based on an angled movement of a video capture device relative to objects within the captured video data. In further examples, the direction of motion arrows within the optical flow field may appear to be angled in the video data based on a combination of the objects that are moving at an angle past the video capture device and the movement of the video capture device itself.

As such, an initial search area 1110 may be translated along motion areas within optical flow field 1100 so as to illustrate modified search area 1120. The degree of translation may be based on the speed of objects between frames. For example, if objects within the video are moving at a relatively slow speed, the modified search area may be located relatively close to the initial search area. However, if objects within the video are moving at a relatively fast speed, the modified search area may be located relatively far from the initial search area. As seen in FIG. 11, the optical flow field does not have a vertical or horizontal bias, as the motion arrows are at a 45 degree angle.

Additional optical flow fields may be generated by rotating a video capture device about a roll axis, by rotating a UAV about camera roll axis, or both. In additional examples, generated optical flow fields may include motion aspects related to the speed of moving objects, distance of moving objects from a video capture device, curving motion of moving objects, directionality of moving objects, and other characteristics of object movement within an optical flow field.

Figure 12:
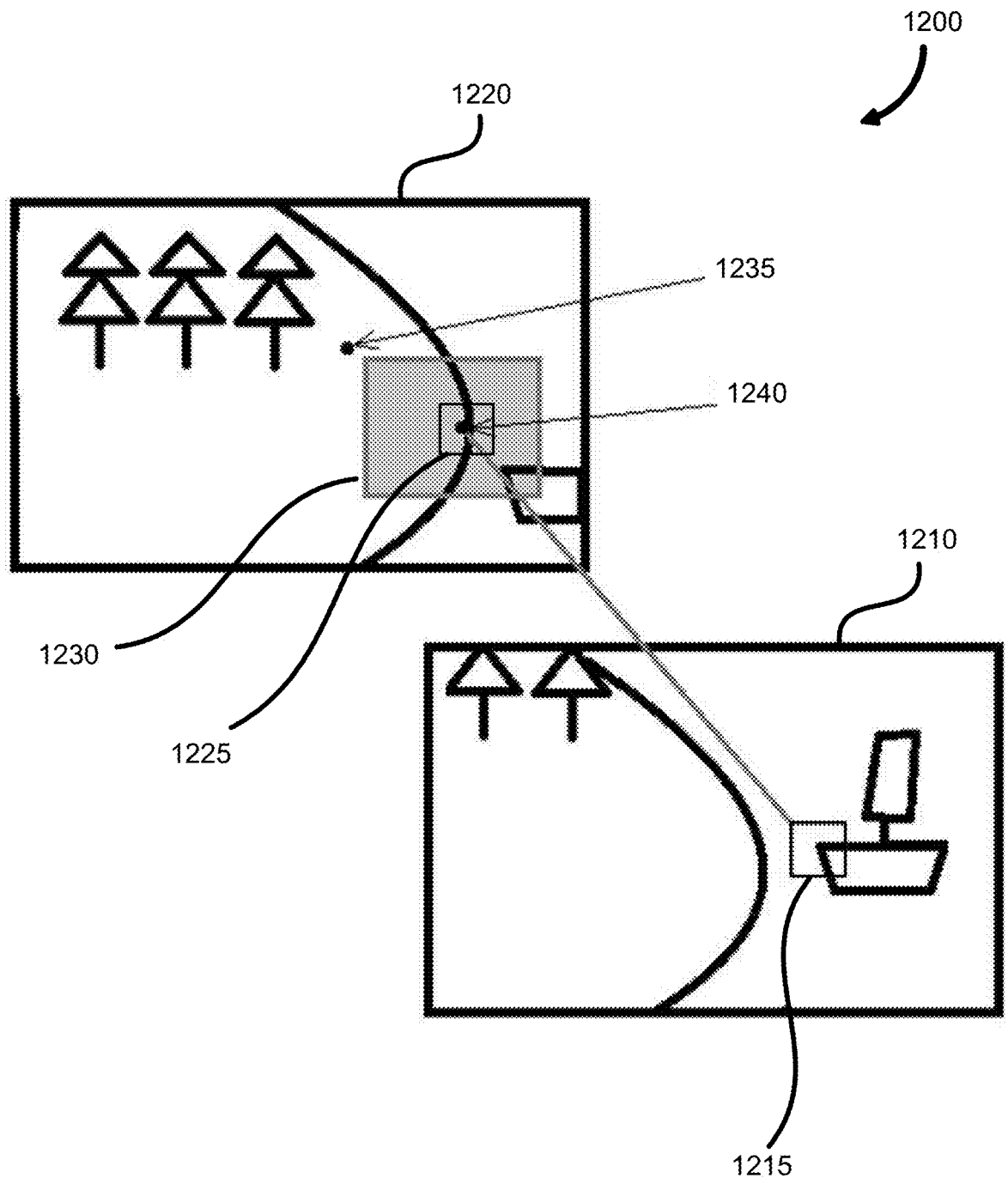
FIG. 12 illustrates a comparison between an initial search point and a biased search point, in accordance with embodiments of the present invention.

In another example, an illustration 1200 of a bias of a search area is provided in FIG. 12. In particular, FIG. 12 illustrates a comparison between an initial search point and a biased search point, in accordance with embodiments of the present invention. The comparison of an initial search point with a biased search point may be used to illustrate a structure of modifying initial searching points and modifying search areas provided for encoding blocks between frames. The optical flow field may already be constructed with the aid of the sensors.

As seen in FIG. 12, a video frame that is already encoded 1210 is provided with a predictive video frame 1220. The video frame that is already encoded 1210 may be used to determine an initial search point 1235 for searching for a motion vector within video frame 1220. In particular, an initial search point may be determined based on the location of a block that is collocated with the block on the video frame that is already encoded 1210. In examples, the initial search point, such as initial search point 1035, may be at the upper left hand corner of the co-located block. However, the initial search point 1235 may be biased based on an optical flow field. In this example, initial search point 1235 may be biased by optical flow field 1100 of FIG. 11, thereby providing biased search point 1240 at a location that is to the downward right of initial search point 1235. The encoding processor may receive or generate information about this field 1100 prior to a calculation of the bias search point. Accordingly, the direction and speed of the motion as perceived in optical flow field 1100 may be used to bias the initial search point by a certain value and search in a larger search window. Further, when evaluating frame 1220 for a motion vector to link block 1225 with encoded block 1215, a search area 1230 may be assessed. Search area 1230 may be larger so as to increase the probability that the motion estimation is able to find a closest block containing a motion vector that is associated with a corresponding portion of the already encoded video frame 1210. Additionally, the search area 1230 may be centered based on the biased search point 1240 rather than the initial search point 1235.

In examples, motion within an optical flow field may be assessed using a vector named MVo=[XMVo, YMVo]. Additionally, the accuracy of the motion vector may be determined to be $\gamma$. To make use of this prior knowledge, the initial point may be biased by the amount of $\gamma*MVo$.

Additionally, for a search range, a set of searching ranges may be predefined. In examples, the shape of a search range may not be restricted to square. However, a square shape may be used in examples. As the search range is of two dimensions, each dimension may have three scales. In examples for a square search range, a width direction may have the dimensions Wsmall, Wnormal and Wlarge. Additionally, a vertical direction may have the dimensions Hsmall, Hnormal and Hlarge. In this way, a 2-dimensional search range may have 9 types of search windows. In examples, a 2-dimensional search range may have a number of pre-defined searching sizes, such as 50 or fewer, 40 or fewer, 30 or fewer, 25 or fewer, 20 or fewer, 15 or fewer, 14 or fewer, 13 or fewer, 12 or fewer, 10 or fewer, 9 or fewer, 8 or fewer, 7 or fewer, 6 or fewer, 5 or fewer, 4 or fewer, 3 or fewer, 2 or fewer, 1 pre-defined search seize, or the 2-dimensional search range may not have a pre-defined search size.

Additionally, a predefined threshold may be used to determine whether the motion is violent. In examples, thresholds may be denoted as $\theta_{low}$ and $\theta_{high}$. Additionally, the search windows dimension [W, H] may be determined using the relationship related to width:

$$W = \begin{cases} W_{small} & W < \theta_{low} \\ W_{normal} & \theta_{low} \leq W \leq \theta_{high} \\ W_{large} & W > \theta_{high} \end{cases}$$

Additionally, a calculation of a height H may be conducted in a similar manner. In examples, when the initial search point is biased and the search window is enlarged, there may be a higher possibility to find the best motion vector.

In the above case, the motion on the whole frame may be unique. However, in some other cases, the initial motion vector and search range may adapt to the optical flow field globally and also locally. In some cases, the motion on the top part of the video frame may be more still than the bottom part of the same video frame. In some other cases, objects that are far away from a frame center may move faster than objects that are closer to the frame center.

Figure 13:
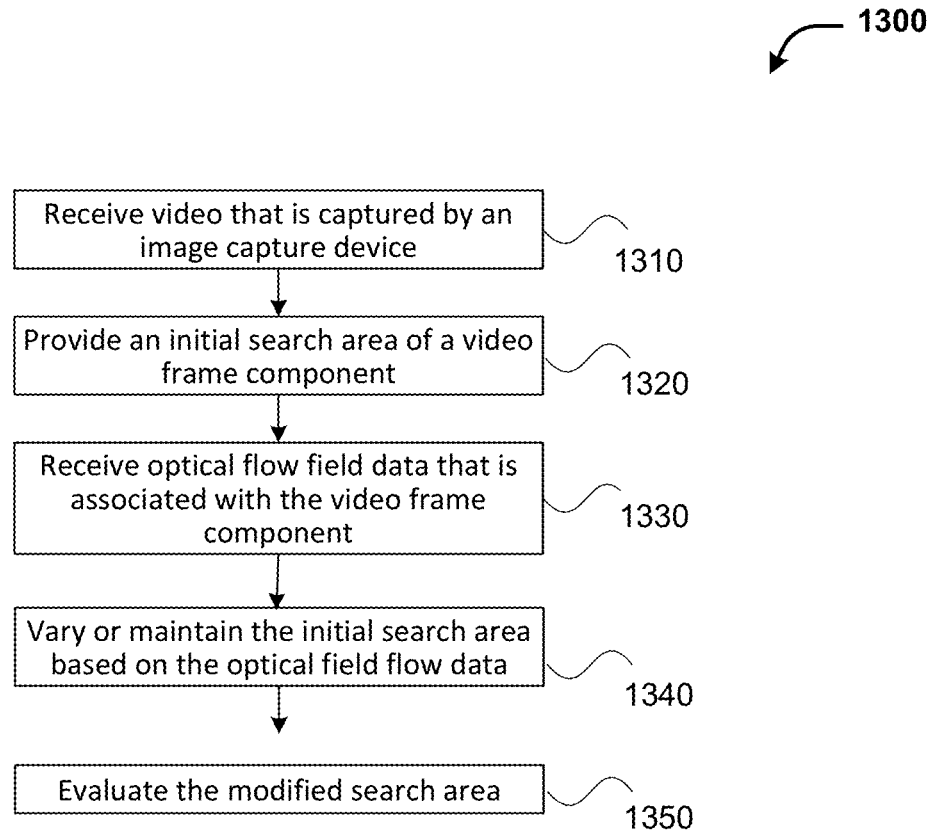
FIG. 13 is a flow chart illustrating a method of evaluating a search area for encoding video based on optical flow field data in accordance with an embodiment of the invention.

FIG. 13 is a flow chart illustrating a method 1300 of evaluating a search area for encoding video based on optical flow field data, in accordance with an embodiment of the invention. At block 1310, video captured by an image capture device is received. The image capture device may be a video capture device. Additionally, the image capture device may be installed on a movable object, such as an unmanned aerial vehicle. Additionally, the video may comprise video frame components. At block 1320, an initial search area of a video frame component is provided. The initial search area may be co-located with a corresponding location on an adjacent video frame. Additionally, the initial search area may have a standard size. At block 1330, optical flow field data that is associated with the video frame component is received. At least a portion of the optical flow field data is captured by sensors. In particular, at least a portion of the optical flow field data may be captured by sensors associated with the UAV. Further, at block 1340, the initial search area is varied or maintained based on the optical flow field data. In examples, the initial search area may be enlarged based on the optical field flow data. In other examples, the initial search area may be translated across a video frame. The varying or maintaining of the initial search area yields a modified search area. At block 1350, the modified search area is evaluated to be encoded motion information of the video captured by the image capture device. In particular, the modified search area may be evaluated to encode a motion vector within a video that is captured by the image capture device.

Figure 14:
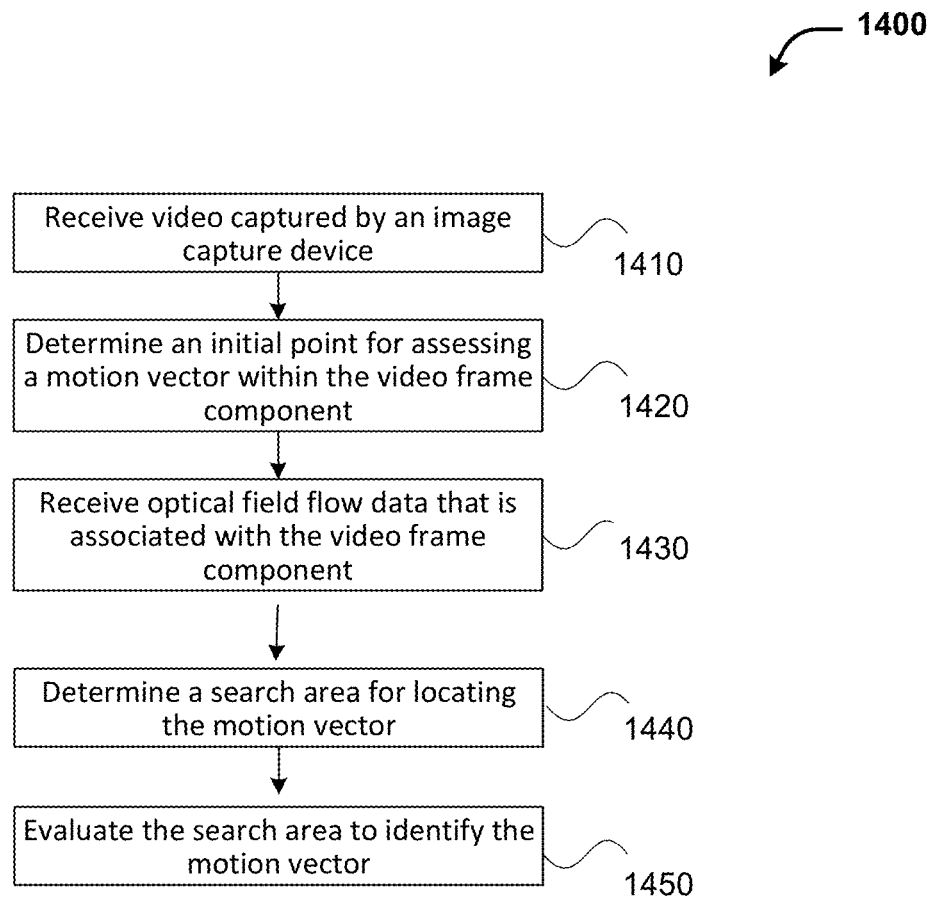
FIG. 14 is a flow chart illustrating a method of identifying a motion vector of a video frame component based on optical flow field data, in accordance with embodiments of the invention.

FIG. 14 is a flow chart illustrating a method 1400 of identifying a motion vector of a video frame component based on optical flow field data, in accordance with embodiments of the invention. At block 1410, video captured by an image capture device is received. In particular, the video comprises a video frame component. The image capture device may be installed on a movable object, such as an unmanned aerial vehicle. Additionally, the video that is captured may be captured by the image capture device while the UAV is in flight. At block 1420, an initial point for assessing a motion vector within the video frame component is determined. In particular, the initial point for assessing a motion vector within the video frame component may be determined by referencing an adjacent video frame. Additionally, at block 1430, optical flow field data that is associated with the video frame component is received. The optical flow field data may be associated with a camera that is capturing video data using a zooming in effect. In particular, the camera may use a zooming in effect by moving close to an object. Additionally, the camera may use a zooming in effect by increasing its magnification of an object. At block 1440, a search area for locating the motion vector is determined. In particular, the search area comprises an initial point. Additionally, the search area is based on the received optical flow field data. In examples, determining the search area may include determining a shape of the search area. In other examples, determining the search area may include determining a location of the search area. Further, at block 1450, the search area is evaluated to identify the motion vector.

Figure 15:
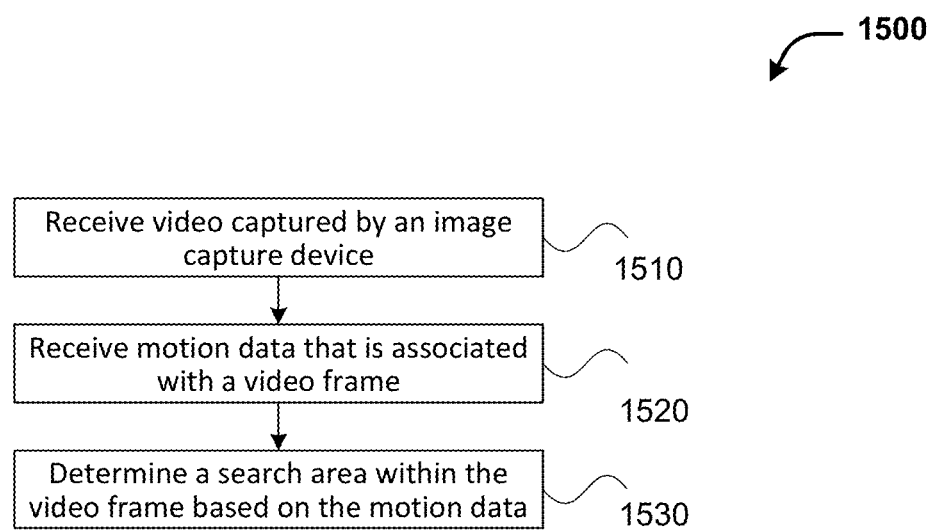
FIG. 15 is a flow chart illustrating a method of determining a search area for encoding video based on motion data, in accordance with embodiments of the invention.

FIG. 15 is a flow chart illustrating a method 1500 of determining a search area for encoding video based on motion data, in accordance with embodiments of the invention. At block 1510, video captured by an image capture device is received. The video comprises a video frame. The video may be captured by an image capture device. At block 1520, motion data that is associated with the video frame is received. The motion data are captured by sensors. In examples, the sensors may be attached to the image capture device. In other examples, the sensors may be external to the image capture device. In further examples, the sensors may be at a location that is remote from the image capture device. Additionally, the video frame comprises a plurality of blocks. In examples, the plurality of blocks may form an array within the video frame. Additionally, at block 1530, a search area within the video frame is determined based on the motion data. The search area is used to evaluate motion of the video captured by the image capture device. In examples, the search area is used to evaluate motion of the video captured by the image capture device to identify a motion vector.

Figure 16:
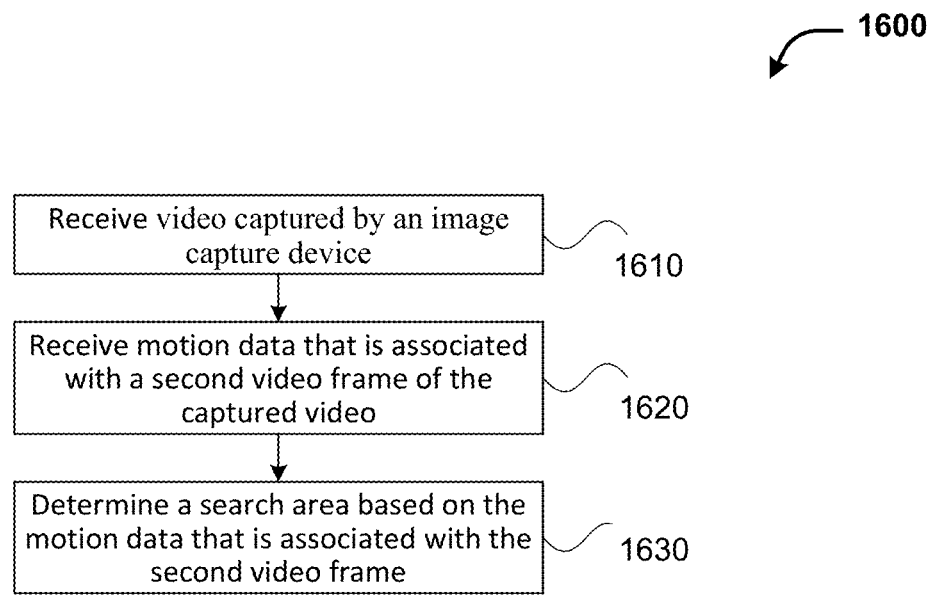
FIG. 16 is a flow chart illustrating another method of determining a search area for encoding video based on motion data, in accordance with embodiments of the invention.

FIG. 16 is a flow chart illustrating a method 1600 of determining a search area for encoding video based on motion data, in accordance with embodiments of the invention. At block 1610, video captured by an image capture device is received. The video comprises a first video frame and a second video frame. In examples, the first video frame may be temporally adjacent to the second video frame. The first video frame may be before the second video frame. Alternatively, the first video frame may be after the second video frame. Additionally, each of the first video frame and the second video frame comprises a plurality of blocks.

At block 1620, motion data that is associated with the second video frame is received. The motion data are captured by sensors. In particular, the sensors may be within the image capture device. Alternatively, the sensors may be remote from the image capture device. At block 1630, a search area within the first video frame is determined based on the motion data that is associated with the second video frame. In examples, the size of the search area may be determined based on the motion data that is associated with the second video frame. In further examples, the location of the search area on the first video frame may be determined based on the motion data that is associated with the second video frame. Additionally, the search area is used to evaluate motion of the video captured by the image capture device. In examples, the search area is used to evaluate motion of the video captured by the image capture device to identify a motion vector within the video.

Figure 17:
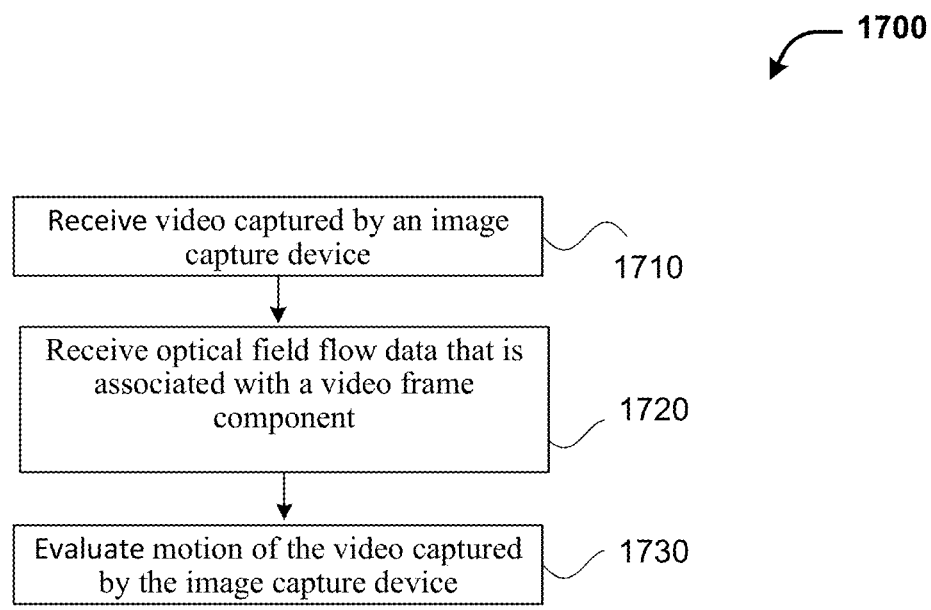
FIG. 17 is a flow chart illustrating another method of encoding video captured by an aerial vehicle based on optical flow field data, in accordance with embodiments of the invention.

FIG. 17 is a flow chart illustrating another method 1700 of encoding video captured by an aerial vehicle based on optical flow field data, in accordance with embodiments of the invention. At block 1710, video captured by an image capture device on-board the aerial vehicle is received. The video comprises video frame components. In examples, the video may be captured by the on-board image capture device while the aerial vehicle is in flight. At block 1720, optical flow field data that is associated with a video frame component is received. At least a portion of the optical flow field data is captured by sensors on-board the aerial vehicle. The sensors may be used to capture location information of the aerial vehicle. In examples, the sensors may be used to capture rotational information of the aerial vehicle. Additionally, at block 1730, motion of the video captured by the image capture device is evaluated for video encoding based on the optical flow field data. In examples, the motion of the video may be evaluated to determine a motion vector associated within a video frame component.

The systems, devices, and methods described herein for video encoding may apply to any video that is captured by a video capture device supported by a variety of objects. In particular, the video may be captured by a video capture device that is supported by an aerial vehicle. As previously mentioned, any description herein of an aerial vehicle, such as a UAV, may apply to and be used for any movable object. Any description herein of an aerial vehicle may apply specifically to UAVs. A movable object of the present invention may be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle, bicycle; a movable structure or frame such as a stick, fishing pole; or a train), under the ground (e.g., a subway), in space (e.g., a spaceplane, a satellite, or a probe), or any combination of these environments. The movable object may be a vehicle, such as a vehicle described elsewhere herein. In some embodiments, the movable object may be carried by a living subject, or take off from a living subject, such as a human or an animal. Suitable animals may include avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object may be constrained with respect to one or more degrees of freedom, such as by a predetermined path, track, or orientation. The movement may be actuated by any suitable actuation mechanism, such as an engine or a motor. The actuation mechanism of the movable object may be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object may be an aerial vehicle. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). An aerial vehicle may be self-propelled, such as self-propelled through the air. A self-propelled aerial vehicle may utilize a propulsion system, such as a propulsion system including one or more engines, motors, wheels, axles, magnets, rotors, propellers, blades, nozzles, or any suitable combination thereof. In some instances, the propulsion system may be used to enable the movable object to take off from a surface, land on a surface, maintain its current position and/or orientation (e.g., hover), change orientation, and/or change position.

The movable object may be controlled remotely by a user or controlled locally by an occupant within or on the movable object. The movable object may be controlled remotely via an occupant within a separate vehicle. In some embodiments, the movable object is an unmanned movable object, such as a UAV. An unmanned movable object, such as a UAV, may not have an occupant on-board the movable object. The movable object may be controlled by a human or an autonomous control system (e.g., a computer control system), or any suitable combination thereof. The movable object may be an autonomous or semi-autonomous robot, such as a robot configured with an artificial intelligence.

The movable object may have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 1000 cm$^3$, 5000 cm$^3$, 10,000 cm$^3$, 100,000 cm$^3$3, 1 m$^3$, or 10 m$^3$. Conversely, the total volume of the movable object may be greater than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 1000 cm$^3$, 5000 cm$^3$, 10,000 cm$^3$, 100,000 cm$^3$, 1 m$^3$, or 10 m$^3$.

In some embodiments, the movable object may have a footprint (which may refer to the lateral cross-sectional area encompassed by the movable object) less than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$. Conversely, the footprint may be greater than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail elsewhere herein. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight may also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

Figure 18:
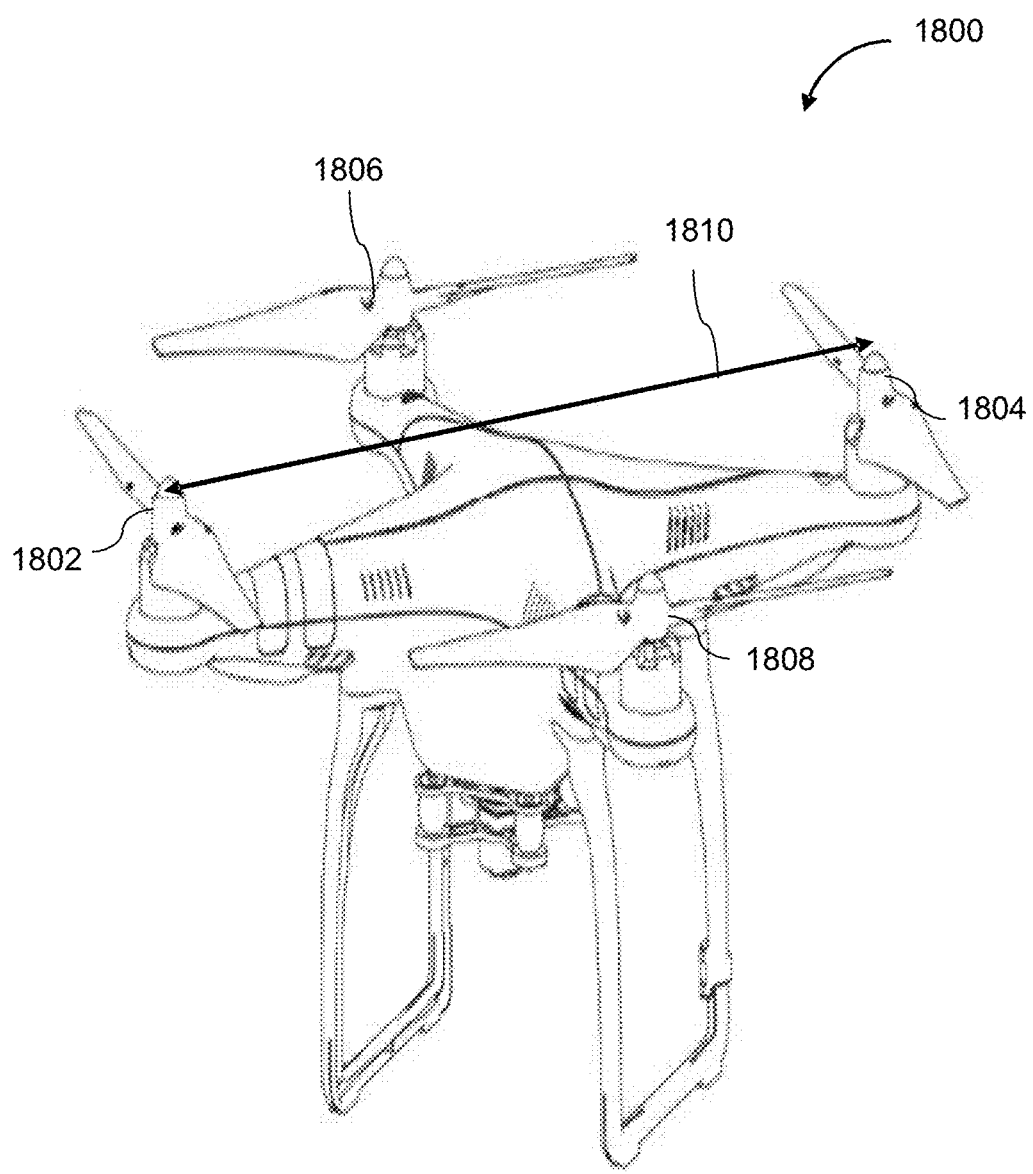
FIG. 18 illustrates an appearance of UAV in accordance with embodiments of the present invention.

FIG. 18 illustrates an unmanned aerial vehicle (UAV) 1800, in accordance with embodiments of the present invention. The UAV may be an example of a movable object as described herein. The UAV 1800 may include a propulsion system having four rotors 1802, 1804, 1806, and 1808. Any number of rotors may be provided (e.g., one, two, three, four, five, six, or more). The rotors, rotor assemblies, or other propulsion systems of the unmanned aerial vehicle may enable the unmanned aerial vehicle to hover/maintain position, change orientation, and/or change location. The distance between shafts of opposite rotors may be any suitable length 410. For example, the length 1810 may be less than or equal to 2 m, or less than equal to 5 m. In some embodiments, the length 1810 may be within a range from 40 cm to 1 m, from 10 cm to 2 m, or from 5 cm to 5 m. Any description herein of a UAV may apply to a movable object, such as a movable object of a different type, and vice versa. The UAV may use an assisted takeoff system or method as described herein.

In some embodiments, the movable object may be configured to carry a load. The load may include one or more of passengers, cargo, equipment, instruments, and the like. The load may be provided within a housing. The housing may be separate from a housing of the movable object, or be part of a housing for a movable object. Alternatively, the load may be provided with a housing while the movable object does not have a housing. Alternatively, portions of the load or the entire load may be provided without a housing. The load may be rigidly fixed relative to the movable object. Optionally, the load may be movable relative to the movable object (e.g., translatable or rotatable relative to the movable object). The load may include a payload and/or a carrier, as described elsewhere herein.

In some embodiments, the movement of the movable object, carrier, and payload relative to a fixed reference frame (e.g., the surrounding environment) and/or to each other, may be controlled by a terminal. The terminal may be a remote control device at a location distant from the movable object, carrier, and/or payload. The terminal may be disposed on or affixed to a support platform. Alternatively, the terminal may be a handheld or wearable device. For example, the terminal may include a smartphone, tablet, laptop, computer, glasses, gloves, helmet, microphone, or suitable combinations thereof. The terminal may include a user interface, such as a keyboard, mouse, joystick, touchscreen, or display. Any suitable user input may be used to interact with the terminal, such as manually entered commands, voice control, gesture control, or position control (e.g., via a movement, location or tilt of the terminal).

The terminal may be used to control any suitable state of the movable object, carrier, and/or payload. For example, the terminal may be used to control the position and/or orientation of the movable object, carrier, and/or payload relative to a fixed reference from and/or to each other. In some embodiments, the terminal may be used to control individual elements of the movable object, carrier, and/or payload, such as the actuation assembly of the carrier, a sensor of the payload, or an emitter of the payload. The terminal may include a wireless communication device adapted to communicate with one or more of the movable object, carrier, or payload.

The terminal may include a suitable display unit for viewing information of the movable object, carrier, and/or payload. For example, the terminal may be configured to display information of the movable object, carrier, and/or payload with respect to position, translational velocity, translational acceleration, orientation, angular velocity, angular acceleration, or any suitable combinations thereof. In some embodiments, the terminal may display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 19:
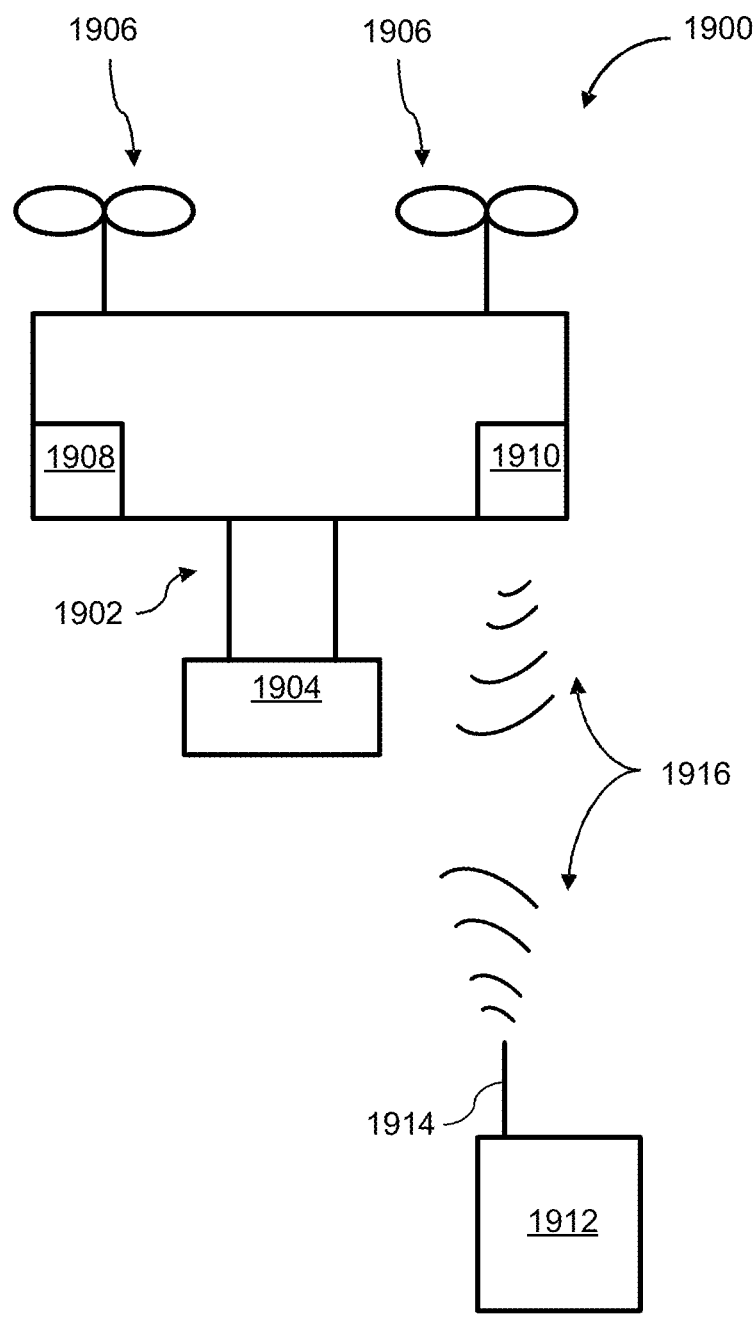
FIG. 19 illustrates a movable object including a carrier and a payload, in accordance with embodiments of the present invention.

FIG. 19 illustrates a movable object 1900 including a carrier 1902 and a payload 1904, in accordance with embodiments. Although the movable object 1900 is depicted as an aircraft, this depiction is not intended to be limiting, and any suitable type of movable object may be used, as previously described herein. One of skill in the art would appreciate that any of the embodiments described herein in the context of aircraft systems may be applied to any suitable movable object (e.g., an UAV). In some instances, the payload 1904 may be provided on the movable object 1900 without requiring the carrier 1902. The movable object 1900 may include propulsion mechanisms 1906, a sensing system 1908, and a communication system 1910.

The propulsion mechanisms 1906 may include one or more of rotors, propellers, blades, engines, motors, wheels, axles, magnets, or nozzles, as previously described. The movable object may have one or more, two or more, three or more, or four or more propulsion mechanisms. The propulsion mechanisms may all be of the same type. Alternatively, one or more propulsion mechanisms may be different types of propulsion mechanisms. The propulsion mechanisms 1906 may be mounted on the movable object 1900 using any suitable means, such as a support element (e.g., a drive shaft) as described elsewhere herein. The propulsion mechanisms 1906 may be mounted on any suitable portion of the movable object 1900, such on the top, bottom, front, back, sides, or suitable combinations thereof.

In some embodiments, the propulsion mechanisms 1906 may enable the movable object 1900 to take off vertically from a surface or land vertically on a surface without requiring any horizontal movement of the movable object 1900 (e.g., without traveling down a runway). Optionally, the propulsion mechanisms 1906 may be operable to permit the movable object 1900 to hover in the air at a specified position and/or orientation. One or more of the propulsion mechanisms 1900 may be controlled independently of the other propulsion mechanisms. Alternatively, the propulsion mechanisms 1900 may be configured to be controlled simultaneously. For example, the movable object 1900 may have multiple horizontally oriented rotors that may provide lift and/or thrust to the movable object. The multiple horizontally oriented rotors may be actuated to provide vertical takeoff, vertical landing, and hovering capabilities to the movable object 1900. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors may be varied independently in order to control the lift and/or thrust produced by each rotor, and thereby adjust the spatial disposition, velocity, and/or acceleration of the movable object 1900 (e.g., with respect to up to three degrees of translation and up to three degrees of rotation).

The sensing system 1908 may include one or more sensors that may sense the spatial disposition, velocity, and/or acceleration of the movable object 1900 (e.g., with respect to up to three degrees of translation and up to three degrees of rotation). The one or more sensors may include global positioning system (GPS) sensors, motion sensors, inertial sensors, proximity sensors, or image sensors. The sensing data provided by the sensing system 1908 may be used to control the spatial disposition, velocity, and/or orientation of the movable object 1900 (e.g., using a suitable processing unit and/or control module, as described below). Alternatively, the sensing system 1908 may be used to provide data regarding the environment surrounding the movable object, such as weather conditions, proximity to potential obstacles, location of geographical features, location of manmade structures, and the like.

The communication system 1910 enables communication with terminal 1912 having a communication system 1914 via wireless signals 1916. The communication systems 1910, 1914 may include any number of transmitters, receivers, and/or transceivers suitable for wireless communication. The communication may be one-way communication, such that data may be transmitted in only one direction. For example, one-way communication may involve only the movable object 1900 transmitting data to the terminal 1912, or vice-versa. The data may be transmitted from one or more transmitters of the communication system 1910 to one or more receivers of the communication system 1912, or vice-versa. Alternatively, the communication may be two-way communication, such that data may be transmitted in both directions between the movable object 1900 and the terminal 1912. The two-way communication may involve transmitting data from one or more transmitters of the communication system 1910 to one or more receivers of the communication system 1914, and vice-versa.

In some embodiments, the terminal 1912 may provide control data to one or more of the movable object 1900, carrier 1902, and payload 1904 and receive information from one or more of the movable object 1900, carrier 1902, and payload 1904 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 1906), or a movement of the payload with respect to the movable object (e.g., via control of the carrier 1902). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 1908 or of the payload 1904). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 1912 may be configured to control a state of one or more of the movable object 1900, carrier 1902, or payload 1904. Alternatively or in combination, the carrier 1902 and payload 1904 may also each include a communication module configured to communicate with terminal 1912, such that the terminal may communicate with and control each of the movable object 1900, carrier 1902, and payload 1904 independently.

In some embodiments, the movable object 1900 may be configured to communicate with another remote device in addition to the terminal 1912, or instead of the terminal 1912. The terminal 1912 may also be configured to communicate with another remote device as well as the movable object 1900. For example, the movable object 1900 and/or terminal 1912 may communicate with another movable object, or a carrier or payload of another movable object. When desired, the remote device may be a second terminal or other computing device (e.g., computer, laptop, tablet, smartphone, or other mobile device). The remote device may be configured to transmit data to the movable object 1900, receive data from the movable object 1900, transmit data to the terminal 1912, and/or receive data from the terminal 1912. Optionally, the remote device may be connected to the Internet or other telecommunications network, such that data received from the movable object 1900 and/or terminal 1912 may be uploaded to a website or server.

Figure 20:
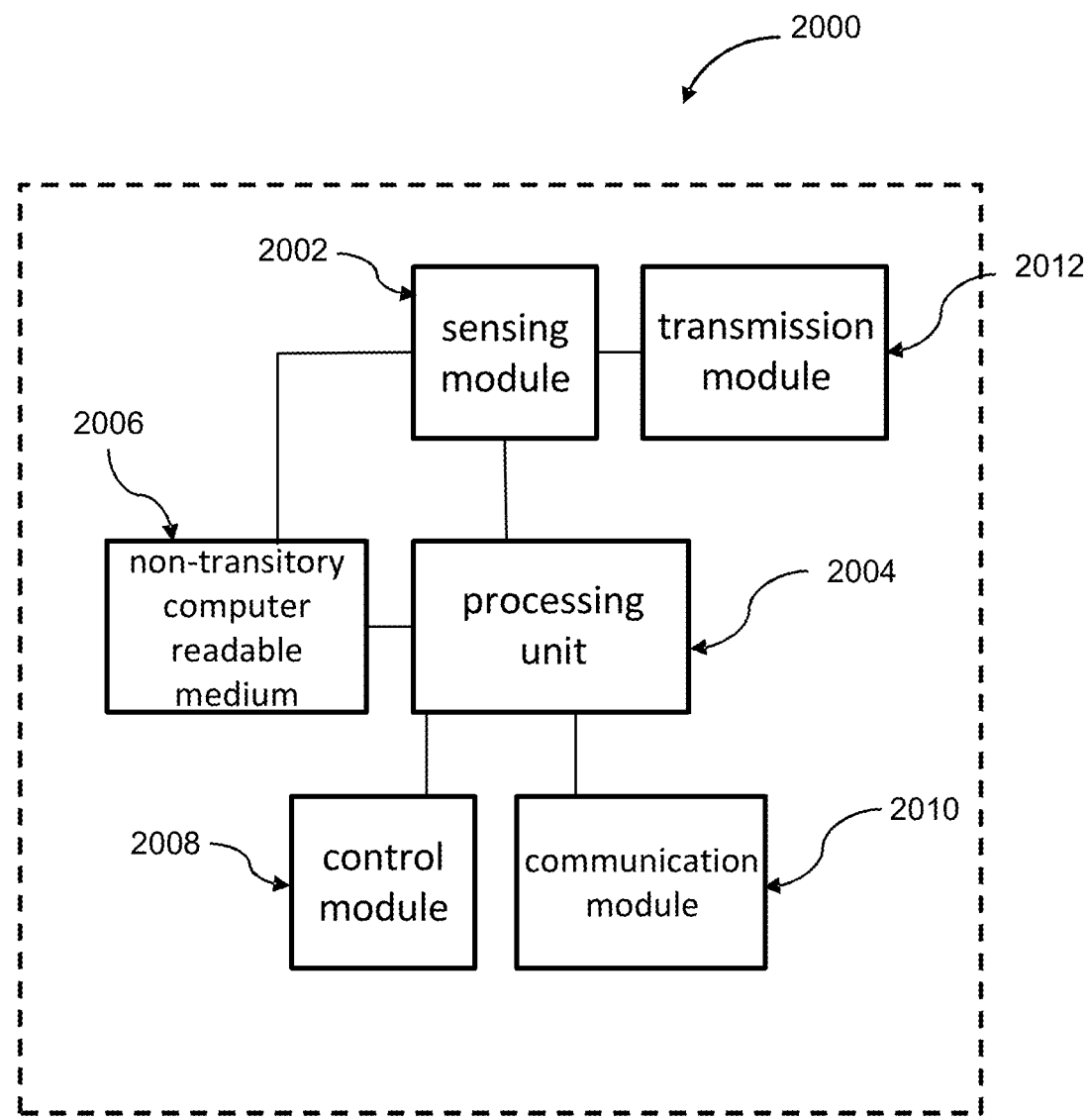
FIG. 20 is a schematic illustration by way of block diagram of a system for controlling a movable object, in accordance with embodiments of the present invention.

FIG. 20 is a schematic illustration by way of block diagram of a system 2000 for controlling a movable object, in accordance with embodiments. The system 2000 may be used in combination with any suitable embodiment of the systems, devices, and methods disclosed herein. The system 2000 may include a sensing module 2002, processing unit 2004, non-transitory computer readable medium 2006, control module 2008, and communication module 2010.

The sensing module 2002 may utilize different types of sensors that collect information relating to the movable objects in different ways. Different types of sensors may sense different types of signals or signals from different sources. For example, the sensors may include inertial sensors, GPS sensors, proximity sensors (e.g., lidar), or vision/image sensors (e.g., a camera). The sensing module 2002 may be operatively coupled to a processing unit 2004 having a plurality of processors. In some embodiments, the sensing module may be operatively coupled to a transmission module 2012 (e.g., a Wi-Fi image transmission module) configured to directly transmit sensing data to a suitable external device or system. For example, the transmission module 2012 may be used to transmit images captured by a camera of the sensing module 2002 to a remote terminal.

The processing unit 2004 may have one or more processors, such as a programmable processor (e.g., a central processing unit (CPU)). The processing unit 2004 may be operatively coupled to a non-transitory computer readable medium 2006. The non-transitory computer readable medium 2006 may store logic, code, and/or program instructions executable by the processing unit 2004 for performing one or more steps. The non-transitory computer readable medium may include one or more memory units (e.g., removable media or external storage such as an SD card or random access memory (RAM)). In some embodiments, data from the sensing module 2002 may be directly conveyed to and stored within the memory units of the non-transitory computer readable medium 2006. The memory units of the non-transitory computer readable medium 2006 may store logic, code and/or program instructions executable by the processing unit 2004 to perform any suitable embodiment of the methods described herein. For example, the processing unit 2004 may be configured to execute instructions causing one or more processors of the processing unit 2004 to analyze sensing data produced by the sensing module. The memory units may store sensing data from the sensing module to be processed by the processing unit 2004. In some embodiments, the memory units of the non-transitory computer readable medium 2006 may be used to store the processing results produced by the processing unit 2004.

In some embodiments, the processing unit 2004 may be operatively coupled to a control module 2008 configured to control a state of the movable object. For example, the control module 2008 may be configured to control the propulsion mechanisms of the movable object to adjust the spatial disposition, velocity, and/or acceleration of the movable object with respect to six degrees of freedom. Alternatively or in combination, the control module 2008 may control one or more of a state of a carrier, payload, or sensing module.

The processing unit 2004 may be operatively coupled to a communication module 2010 configured to transmit and/or receive data from one or more external devices (e.g., a terminal, display device, or other remote controller). Any suitable means of communication may be used, such as wired communication or wireless communication. For example, the communication module 2010 may utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, may be used. Wireless communications may be proximity dependent or proximity independent. In some embodiments, line-of-sight may or may not be required for communications. The communication module 2010 may transmit and/or receive one or more of sensing data from the sensing module 2002, processing results produced by the processing unit 2004, predetermined control data, user commands from a terminal or remote controller, and the like.

The components of the system 2000 may be arranged in any suitable configuration. For example, one or more of the components of the system 2000 may be located on the movable object, carrier, payload, terminal, sensing system, or an additional external device in communication with one or more of the above. Additionally, although FIG. 20 depicts a single processing unit 2004 and a single non-transitory computer readable medium 2006, one of skill in the art would appreciate that this is not intended to be limiting, and that the system 2000 may include a plurality of processing units and/or non-transitory computer readable media. In some embodiments, one or more of the plurality of processing units and/or non-transitory computer readable media may be situated at different locations, such as on the movable object, carrier, payload, terminal, sensing module, additional external device in communication with one or more of the above, or suitable combinations thereof, such that any suitable aspect of the processing and/or memory functions performed by the system 2000 may occur at one or more of the aforementioned locations.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method of evaluating a search area for encoding video, said method comprising:
  receiving video captured by an image capture device, the video comprising video frame components;
  receiving sensor data from a plurality of sensors, the sensor data including information about a spatial disposition of the image capture device, a movement of the image capture device, a zoom state of the image capture device, and a field of view (FOV) of the image capture device;
  generating, using the sensor data, an optical flow field associated with a video frame component of the video frame components;
  obtaining a first initial search area within the video frame component;
  determining, based on the optical flow filed, a bias of the first initial search area;
  adjusting, based on the optical flow field, the first initial search area to determine a first search area within the video frame component, wherein adjusting the first initial search area includes, based on the bias of the first initial search area:

adjusting a number of sides of a boundary of the first initial search area from a first number to a second number that is different from the first number; or adjusting the boundary of the first initial search area by a first ratio in one direction and adjusting the boundary of the first initial search area by a second ratio in another direction, the first ratio being different from the second ratio;

providing a second initial search area of the video frame component; and adjusting the second initial search area based on the optical flow field to yield a second search area.

2. The method of claim 1, further comprising evaluating the first search area within the video frame component to be encoded using motion information of the video captured by the image capture device.

3. The method of claim 2, wherein the step of evaluating the first search area occurs while a movable object carrying the image capture device is in flight, and wherein the movable object is an unmanned aerial vehicle (UAV).

4. The method of claim 1, wherein adjusting the first initial search area further includes varying a dimension of the first initial search area.

5. The method of claim 1, wherein adjusting the first initial search area further includes varying a location of the first initial search area.

6. The method of claim 5, wherein the optical flow field bias the location of an initial point of the first initial search area based on a motion vector of a previous frame.

7. The method of claim 1, wherein adjusting the first initial search area further includes vertically elongating the first initial search area when the optical flow field indicates a vertical bias.

8. The method of claim 1, wherein adjusting the first initial search area further includes moving a position of the first initial search area on a video frame component along a circular arc when the optical flow field indicates a rotation.

9. The method of claim 2, wherein the first search area is evaluated to identify a motion vector within the video frame component.

10. The method of claim 1, wherein the second search area is smaller than the first search area.

11. The method of claim 1, wherein the video frame component is a block within a video frame, wherein the video frame comprises a plurality of blocks.

12. The method of claim 11, wherein the block is an encoding video block.

13. The method of claim 1, wherein the image capture device is installed on an unmanned aerial vehicle (UAV).

14. A non-transitory computer readable medium containing program instructions for evaluating a search area for encoding video, said computer readable medium comprising:

program instructions for receiving video captured by an image capture device, the video comprising video frame components;

program instructions for receiving sensor data from a plurality of sensors, the sensor data including information about a spatial disposition of the image capture device, a movement of the image capture device, a zoom state of the image capture device, and a field of view (FOV) of the image capture device;

program instructions for generating, using the sensor data, an optical flow field associated with a video frame component of the video frame components;

program instructions for obtaining a first initial search area within the video frame component;

program instructions for determining a bias of the first initial search area based on the optical flow field;

program instructions for adjusting, based on the optical flow field, the first initial search area to determine a first search area within the video frame component, wherein adjusting the first initial search area includes, based on the bias of the first initial search area:

adjusting a number of sides of a boundary of the first initial search area from a first number to a second number that is different from the first number; or adjusting the boundary of the first initial search area by a first ratio in one direction and adjusting the boundary of the first initial search area by a second ratio in another direction, the first ratio being different from the second ratio;

program instructions for providing a second initial search area of the video frame component; and program instructions for adjusting the second initial search area based on the optical flow field to yield a second search area.

15. A system for evaluating a search area for encoding video, said system comprising:

an image capture device configured to capture a video;

one or more sensors configured to obtain sensor data; and one or more processors, individually or collectively configured to:

receive the video captured by the image capture device, the video comprising video frame components;

receive the sensor data from the one or more sensors, the sensor data including information about a spatial disposition of the image capture device, a movement of the image capture device, a zoom state of the image capture device, and a field of view (FOV) of the image capture device;

generate, using the sensor data, an optical flow field associated with a video frame component of the video frame components;

obtain a first initial search area within the video frame component;

determine, according to the optical flow field, a bias of the first initial search area; and adjust, based on the optical flow field, the first initial search area to determine a first search area within the video frame component, wherein adjusting the first initial search area includes, based on the bias of the first initial search area:

adjusting a number of sides of a boundary of the first initial search area from a first number to a second number that is different from the first number; or adjusting the boundary of the first initial search area by a first ratio in one direction and adjusting the boundary of the first initial search area by a second ratio in another direction, the first ratio being different from the second ratio;

provide a second initial search area of the video frame component; and adjust the second initial search area based on the optical flow field to yield a second search area.

16. The method of claim 1, wherein the optical flow field includes a plurality of arrows that indicate a plurality of optical flow vectors, and adjusting the first initial search area further includes adjusting the first initial search area based on a density of the plurality of arrows.

17. The method of claim 1,
wherein the video includes one or more objects;
the method further comprising:

determining, based on the optical flow field, whether the image capture device moves with respect to the one or more objects faster in the one direction than in the another direction, in response to determining the image capture device moves with respect to the one or more objects faster in the one direction than in the another direction, adjusting the boundary of the first initial search area by the first ratio in the one direction and adjusting the boundary of the first initial search area by the second ratio in the another direction, the first ratio being greater than the second ratio.

\* \* \* \* \*